United States Patent
Omori et al.

(10) Patent No.: US 7,848,768 B2
(45) Date of Patent: Dec. 7, 2010

(54) NETWORK SYSTEM AND COMMUNICATION DEVICE

(75) Inventors: Kazuo Omori, Tokyo (JP); Akihiro Ihori, Kanagawa (JP)

(73) Assignee: Sony Corporation, Tokyo (JP)

( * ) Notice: Subject to any disclaimer, the term of this patent is extended or adjusted under 35 U.S.C. 154(b) by 1140 days.

(21) Appl. No.: 11/194,541

(22) Filed: Aug. 2, 2005

(65) Prior Publication Data

US 2006/0120319 A1 Jun. 8, 2006

(30) Foreign Application Priority Data

Dec. 8, 2004 (JP) ............................... 2004-354803

(51) Int. Cl.
*H04B 7/00* (2006.01)
*H04B 15/00* (2006.01)

(52) U.S. Cl. ........................ 455/503; 455/500; 455/502; 455/507; 455/514; 455/41.2; 455/3.01; 455/3.05; 455/3.06; 455/410; 455/411; 455/418; 455/420; 370/254; 370/255; 709/220; 709/221; 709/222; 709/223; 709/225; 709/226; 710/8; 710/10; 710/12

(58) Field of Classification Search ................ 455/3.01, 455/3.03–3.06, 410–411, 418, 420, 41.2, 455/500, 502–503, 507–514; 370/254–255, 370/328, 400–402; 709/220–226; 710/8–19
See application file for complete search history.

(56) References Cited

U.S. PATENT DOCUMENTS

| | | | | |
|---|---|---|---|---|
| 6,553,431 | B1 * | 4/2003 | Yamamoto et al. | ............. 710/8 |
| 6,910,085 | B2 * | 6/2005 | Takaku et al. | ................ 710/62 |
| 6,993,558 | B2 * | 1/2006 | Yokokura | ................... 709/203 |
| 6,996,611 | B1 * | 2/2006 | Muto | ......................... 709/223 |
| 7,284,013 | B2 * | 10/2007 | Ochiai et al. | ............ 707/103 X |
| 7,379,991 | B2 * | 5/2008 | Muto | ........................ 709/223 |

FOREIGN PATENT DOCUMENTS

| | | |
|---|---|---|
| JP | 2001-333089 | 11/2001 |
| JP | 2003-324447 | 11/2003 |
| WO | WO 00/76131 A1 | 12/2000 |

* cited by examiner

*Primary Examiner*—Tuan A Tran
(74) *Attorney, Agent, or Firm*—Oblon, Spivak, McClelland, Maier & Neustadt, L.L.P.

(57) ABSTRACT

A network system includes at least first and second communication devices connected in a network. The first communication device includes an inquiry device for inquiring the attributes of the second communication device to the second communication device via the network. The second communication device includes an attribute holding device for holding the attributes and a search device for searching for the attributes held in the attribute holding device in response to the inquiry and responds back with the search result to the inquiry device. The attribute holding device and the search device operate in a data link layer.

23 Claims, 21 Drawing Sheets

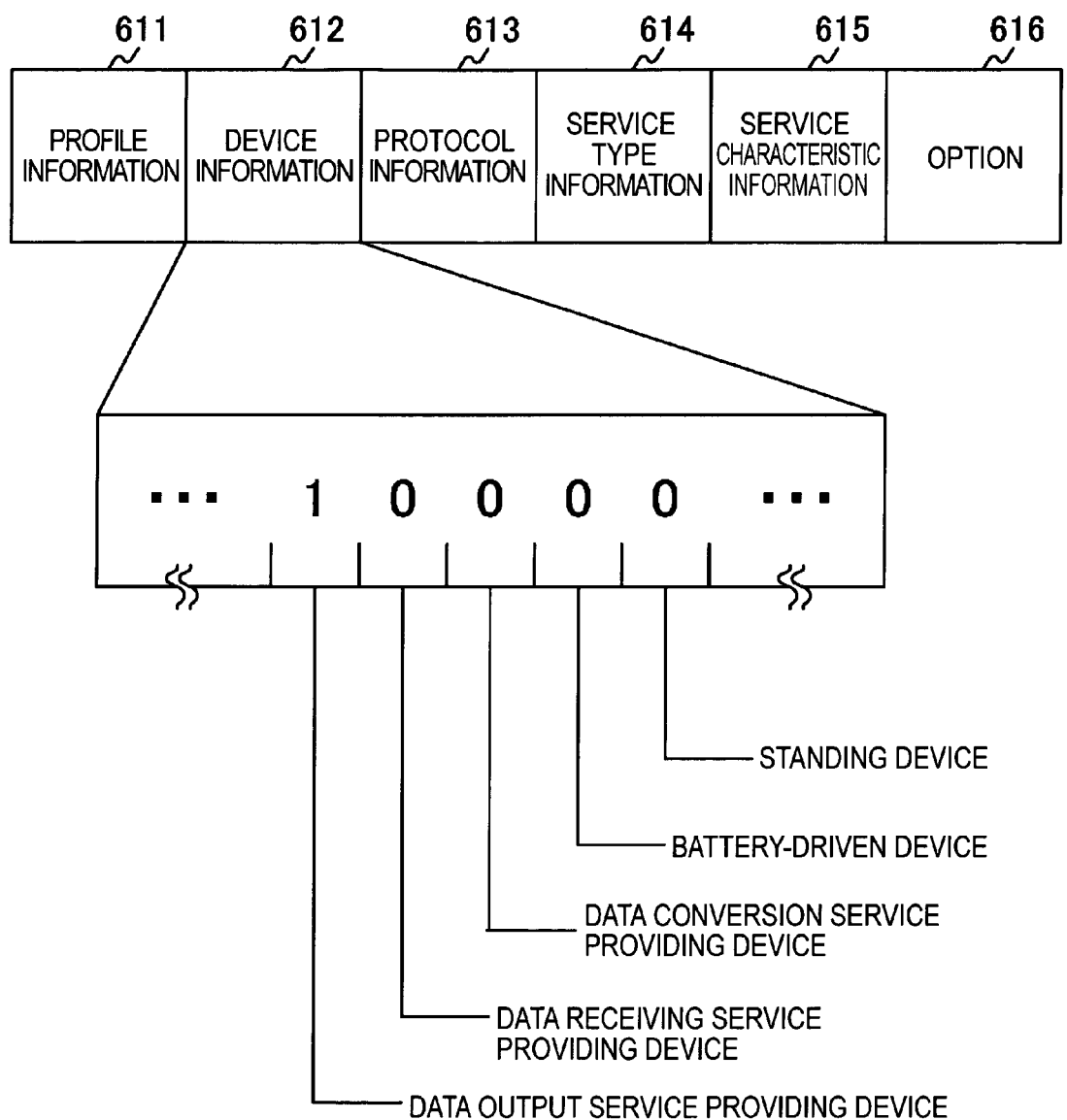

FIG. 6

| 614 | 615 |
|---|---|
| AUDIO | LPCM, AAC, AC3, ATRAC3plus, MP3, WMA9, WAV |
| CONTROL | INPUT CONTROL DEVICE, OUTPUT CONTROL DEVICE |
| DATA | TEXT DATA, BINARY DATA, HTML, XML |
| STILL IMAGE | JPEG, PNG, GIF, TIFF, BMP, YUV, JPEG2000 |
| MOVING IMAGE | MPEG1, MPEG2, MPEG4, WMV9 |
| NETWORK | GATEWAY, ROUTER, BRIDGE, DNS |
| APPLICATION | HOME THEATER, HOME SERVER, COMPUTER, CD PLAYER, DVD PLAYER, TELEVISION, PROJECTOR, SPEAKER, REMOTE CONTROLLER, VIDEO CAMERA, DIGITAL STILL CAMERA, GAME |

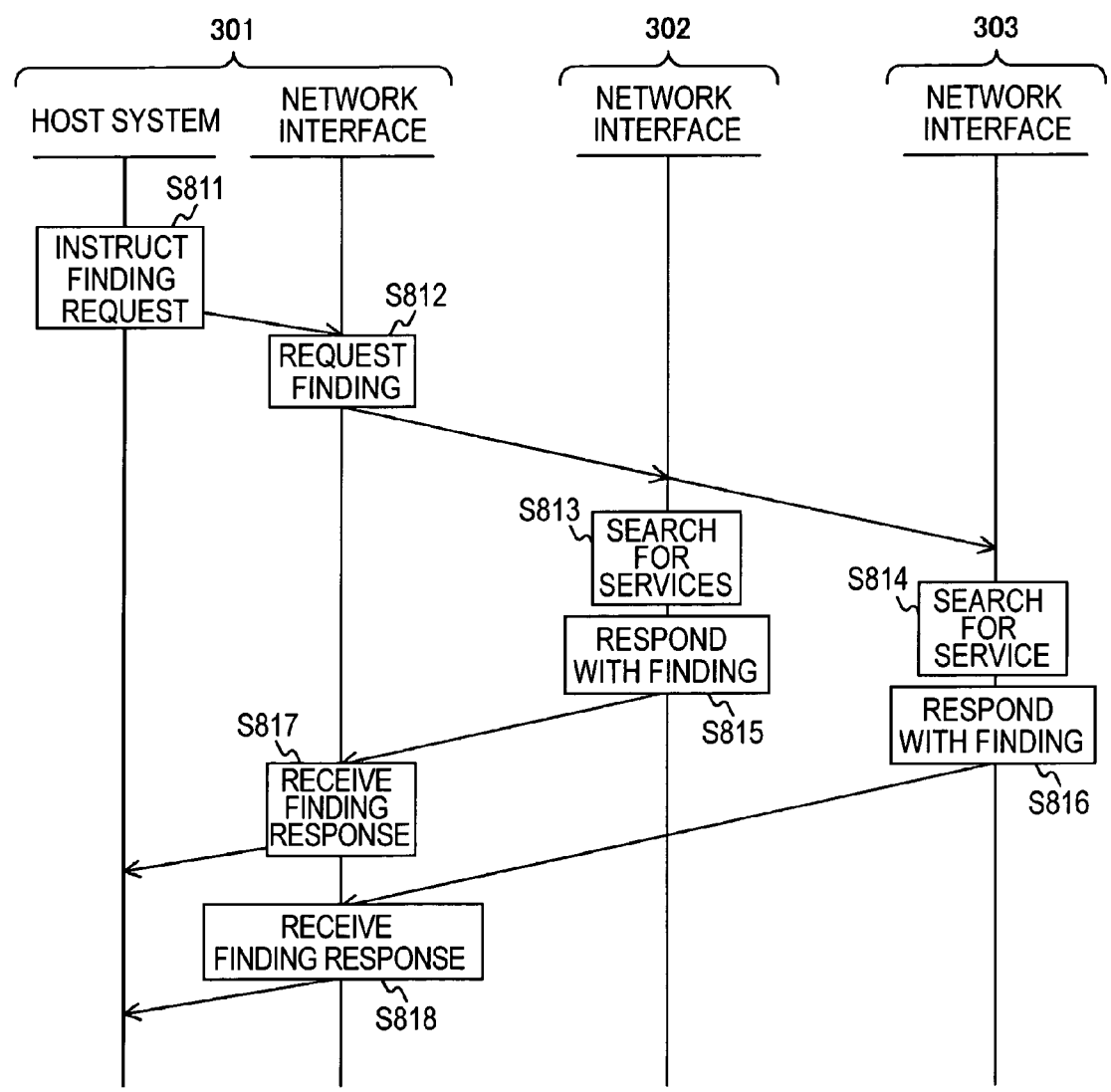

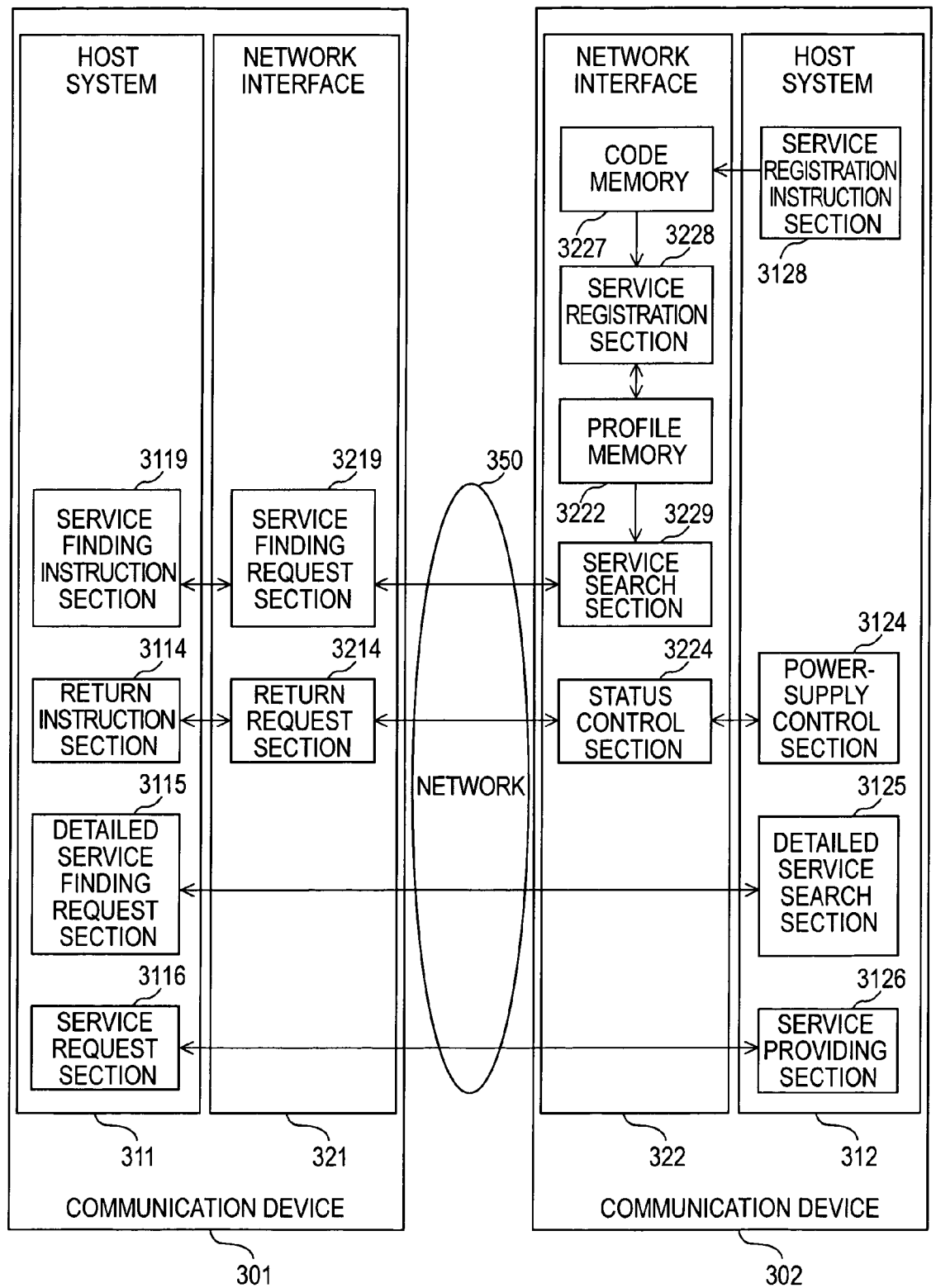

NETWORK SYSTEM AND COMMUNICATION DEVICE

CROSS REFERENCES TO RELATED APPLICATIONS

The present invention contains subject matter related to Japanese Patent Application JP 2004-354803 filed in the Japanese Patent Office on Dec. 8, 2004, the entire contents of which are incorporated herein by reference.

BACKGROUND OF THE INVENTION

1. Field of the Invention

The present invention relates to a network system and a communication device constituting the network system. More particularly, the present invention relates to a network system in which, in response to a request from a communication device, another communication device provides services; to a communication device for use therewith; to a processing method for use therewith; and to a program for enabling a computer to perform the processing method.

2. Description of the Related Art

As digital devices typified by a computer have become popular and those devices have been introduced into each household, how those devices can be easily handled has become a problem irrespective of the user. In particular, general users having no expertise knowledge are confused as to how the purchased devices are to be connected to construct a system. Furthermore, there is a risk in that, with the settings being insufficient, it is difficult to fully utilize the functions possessed by the devices.

In order to solve such problems, functions for allowing a newly introduced device to be used as is without performing a special setting have been proposed. For example, in the universal plug and play (UPnP: Universal Plug and Play), devices can be connected to a network without setting the network. More specifically, processing such that an IP (Internet Protocol) address is dynamically obtained, content of services that can be provided by the device itself is reported, content of services that can be provided by another device is obtained is performed so as to make preparations necessary for the subsequent control among the devices.

As described above, in order to perform device control in the network, it is necessary that the attributes of each device be mutually known in advance. For example, in the UPnP, since each process is performed using an IP layer, which is a network layer, it is presupposed that a host system for processing the IP layer is always in a running (wake) state. For this reason, the timing at which the host system is placed in a standby (sleep) status is limited, and it is difficult to reduce power consumption. Furthermore, in this UPnP, assuming that each device connected to the network is in a running status, communication based on broadcast or multicast is often used among the devices. Therefore, not only is the power consumption increased, but also the amount of communication data is increased.

In comparison, in a network system of the related art, a technology has been proposed in which, for the purpose of reducing power consumption, a server performing proxy pickup in place of a device in a standby status is provided, and the server returns the device from the sleep status to the running status when a message for the device in the wake state is received (refer to, for example, Japanese Unexamined Patent Application Publication No. 2000-165419 (FIG. 1)).

SUMMARY OF THE INVENTION

In the above-described UPnP, since processing for searching for services is performed using the IP layer, it is presupposed that the devices are typically in a running status. In such a network system, it has been proposed in the manner described above that a proxy pickup server is provided to reduce power consumption.

However, it is not always possible to provide such a proxy pickup server, and it may be impossible to apply such a technology in a network system in which devices are autonomously connected to one another.

In order to solve such problems, it is desirable to reduce power consumption in a network system in which devices connected in a network are known.

According to an embodiment of the present invention, there is provided a network system including: at least first and second communication devices connected in a network, wherein the first communication device includes inquiry means for inquiring the attributes of the second communication device to the second communication device via the network, the second communication device includes attribute holding means for holding the attributes and search means for searching for the attributes held in the attribute holding means in response to the inquiry and responds back with the search result to the inquiry means, and the attribute holding means and the search means operate in a data link layer. As a result, this brings about the effect that the search of the attributes of the second communication device with respect to the inquiry from the first communication device and the response therefore are performed in the data link layer.

In the communication device according to the embodiment of the present invention, preferably, the attributes of the communication device contain information indicating whether or not services provided by the communication device are permitted, the inquiry means makes an inquiry by targeting the permitted services, and the search means performs the search by targeting the permitted services in response to the inquiry.

According to another embodiment of the present invention, there is provided a communication device, which is one of a plurality of communication devices connected in a network, the communication device including: attribute holding means for holding the attributes of the target communication device; and search means for searching for the attributes held in the attribute holding means in response to an inquiry from another communication device via the network and responding back the search result to the other communication device via the network, wherein the attribute holding means and the search means operate in a data link layer. As a result, this brings about the effect that the search of the attributes of the target communication device with respect to the inquiry from another communication device and the response therefore are performed in the data link layer.

In the communication device according to the embodiment of the present invention, preferably, the attributes of the communication device contain information indicating whether or not services provided by the target communication device are permitted, and if the inquiry is an inquiry targeting the permitted services, the search means performs the search by targeting the permitted services in response to the inquiry. As a result, this brings about the effect that the search for the inquiry that targets the permitted services is performed.

In the communication device according to the embodiment of the present invention, preferably, the attributes of the communication device further contain publisher information indicating the publisher who has permitted the services provided by the target communication device, and if the inquiry is an inquiry in which the publisher information is specified, the search means performs the search by targeting the services in which publisher information matches in response to the inquiry. As a result, this brings about the effect that the search in which publisher information is considered with regard to the inquiry targeting the permitted services is performed.

The communication device may further include attribute registration means for registering the attributes of the communication device in the attribute holding means. As a result, this brings about the effect that the target communication device performs registration of attributes to the attribute registration means.

In the communication device according to the embodiment of the present invention, preferably, the attributes of the communication device contain information indicating whether or not services provided by the target communication device are permitted, and the attribute registration means verifies the presented authentication code when the services are permitted in the attributes to be registered of the communication device and performs the registration only when the authentication code is valid. As a result, this brings about the effect that, only when a valid authentication code is presented, the registration of attributes indicating the permitted services is performed.

In the communication device according to the embodiment of the present invention, preferably, when the attributes that duplicate to the attributes to be registered of the communication device are already registered, the attribute registration means newly registers the attributes of the communication device only when the services in the already registered attributes are not permitted. As a result, this brings about the effect that, if the already registered duplicating attributes are permitted, these are not overwritten.

In the communication device according to the embodiment of the present invention, preferably, the attributes of the communication device contain information about services provided by the target communication device. As a result, this brings about the effect that, when the attributes of the target communication device are sent back in response to the inquiry, the services provided by the target communication device are informed to the other communication device.

In the communication device according to the embodiment of the present invention, preferably, the information about the services provided by the communication device contains the type of a protocol that governs the target services. As a result, this brings about the effect that the processing in the communication device is switched according to the type of the protocol that governs the services.

In the communication device according to the embodiment of the present invention, preferably, the information about the services provided by the communication device contains the content and the type of the target services. As a result, this brings about the effect that the large category and the small category of the services are informed to the other communication device.

In the communication device according to the embodiment of the present invention, preferably, the attribute holding means holds the attributes using a plurality of bits and allows information about the services to correspond to each of the plurality of the bits. As a result, this brings about the effect that processing by the search means is made easier.

The communication device may further include higher-order layer processing means for processing layers at an order higher than the data link layer in the communication device, and the attributes of the communication device contain the operation state of the higher-order layer processing means. As a result, this brings about the effect that the operating state of the higher-order layer processing means is informed to the other communication device.

In the communication device according to the embodiment of the present invention, preferably, the operation state indicates whether or not the higher-order layer processing means is in a standby state. As a result, this brings about the effect that the operating state of the higher-order layer processing means is informed to the other communication device.

The communication device may further include status control means for controlling the running state in response to a request from another communication device via the network. As a result, this brings about the effect that the operating state of the higher-order layer processing means is controlled in response to a request from another communication device.

In the communication device according the embodiment of the present invention, preferably, the network is a wireless ad hoc network, and the communication device is a wireless terminal that constitutes the wireless ad hoc network. As a result, this brings about the effect that the independence characteristics among the communication devices is increased, and the search of the attributes of the target communication device and the response therefore are effectively performed.

According to another embodiment of the present invention, there is provided a processing method through a data link layer for use with a communication device, which is one of a plurality of communication devices connected in a network, the communication device including attribute holding means for holding the attributes of the target communication device, the processing method including the steps of: receiving an inquiry from another communication device via the network; searching for the attributes held in the attribute holding means in response to the inquiry; and responding back the search result to the other communication device via the network. As a result, this brings about the effect that the search of the attributes of the target communication device with respect to the inquiry from another communication device and the response therefore are performed in the data link layer.

According to another embodiment of the present invention, there is provided a processing method through a data link layer for use with a communication device, which is one of a plurality of communication devices connected in a network, the communication device including attribute holding means for holding the attributes of the target communication device, and the attributes of the communication device containing information indicating whether or not the services provided by the target communication device are permitted, the processing method including the steps of: receiving an inquiry that targets the permitted services from another communication device via the network; searching for the attributes held in the attribute holding means by targeting the permitted services in response to the inquiry; and responding back the search result to the other communication device via the network. As a result, this brings about the effect that the search for the inquiry that targets the permitted services is performed.

According to another embodiment of the present invention, there is provided a processing method through a data link layer for use with a communication device, which is one of a plurality of communication devices connected in a network, the communication device including attribute holding means for holding the attributes of the target communication device and higher-order layer processing means for processing layers at an order higher than a data link layer in the target communication device, the processing method including the steps of: allowing the higher-order layer processing means to be placed in a standby status; receiving an inquiry from another communication device via the network; searching for the attributes held in the attribute holding means in response to the inquiry; responding back the search result to the other communication device via the network; receiving a return request from the other communication device via the network; and returning the higher-order layer processing means from the standby status in response to the inquiry. As a result, this brings about the effect that the search of the attributes of the target communication device with respect to the inquiry from another communication device and the response therefore are performed in the data link layer, and that the return from the standby status of the higher-order layer processing means is performed from another communication device.

According to another embodiment of the present invention, there is provided a program for use with a communication device, which is one of a plurality of communication devices connected in a network, the communication device including attribute holding means for holding the attributes of the target communication device, the program enabling a computer to perform processing for a data link layer and including the steps of: receiving an inquiry from another communication device via the network; searching for the attributes held in the attribute holding means in response to the inquiry; and responding back the search result to the other communication device via the network. As a result, this brings about the effect that the search of the attributes of the target communication device with respect to the inquiry from another communication device and the response therefore are performed in the data link layer.

According to another embodiment of the present invention, there is provided a program for use with a communication device, which is one of a plurality of communication devices connected in a network, the communication device including attribute holding means for holding the attributes of the target communication device, the attributes of the communication device containing information indicating whether or not the services provided by the target communication device are permitted, the program enabling a computer to perform processing for a data link layer and including the steps of: receiving an inquiry that targets the permitted services from another communication device via the network; searching for the attributes held in the attribute holding means by targeting the permitted services in response to the inquiry; and responding back the search result to the other communication device via the network. As a result, this brings about the effect that the search for the inquiry that targets the permitted services is performed.

According to another embodiment of the present invention, there is provided a program for use with a communication device, which is one of a plurality of communication devices connected in a network, the communication device including attribute holding means for holding the attributes of the target communication device and higher-order layer processing means for processing layers at an order higher than a data link layer in the target communication device, the program enabling a computer to perform processing for a data link layer and including the steps of: allowing the higher-order layer processing means to be placed in a standby status; receiving an inquiry from another communication device via the network; searching for the attributes held in the attribute holding means in response to the inquiry; responding back the search result to the other communication device via the network; receiving a return request from the other communication device via the network; and returning the higher-order layer processing means from the standby status in response to the request. As a result, this brings about the effect that the search of the attributes of the target communication device with respect to the inquiry from another communication device and the response therefore are performed in the data link layer, and that the return from the standby status of the higher-order layer processing means is performed from another communication device.

According to the embodiments of the present invention, in the network system in which the attributes of devices connected in the network are known, the excellent advantage of reducing power consumption is exhibited.

BRIEF DESCRIPTION OF THE DRAWINGS

FIG. 5 shows an example of the configuration of a service profile 610 according to the embodiment of the present invention;

FIG. 6 shows service type information 614 and service characteristic information 615 of the service profile 610 according to the embodiment of the present invention;

FIG. 7 is a sequence chart showing the flow of service finding according to the embodiment of the present invention;

FIG. 18 shows an example of the structure of functions of a communication device according to the other embodiment of the present invention;

DESCRIPTION OF THE PREFERRED EMBODIMENTS

Embodiments of the present invention will now be described below in detail with reference to the drawings.

Figure 1A:
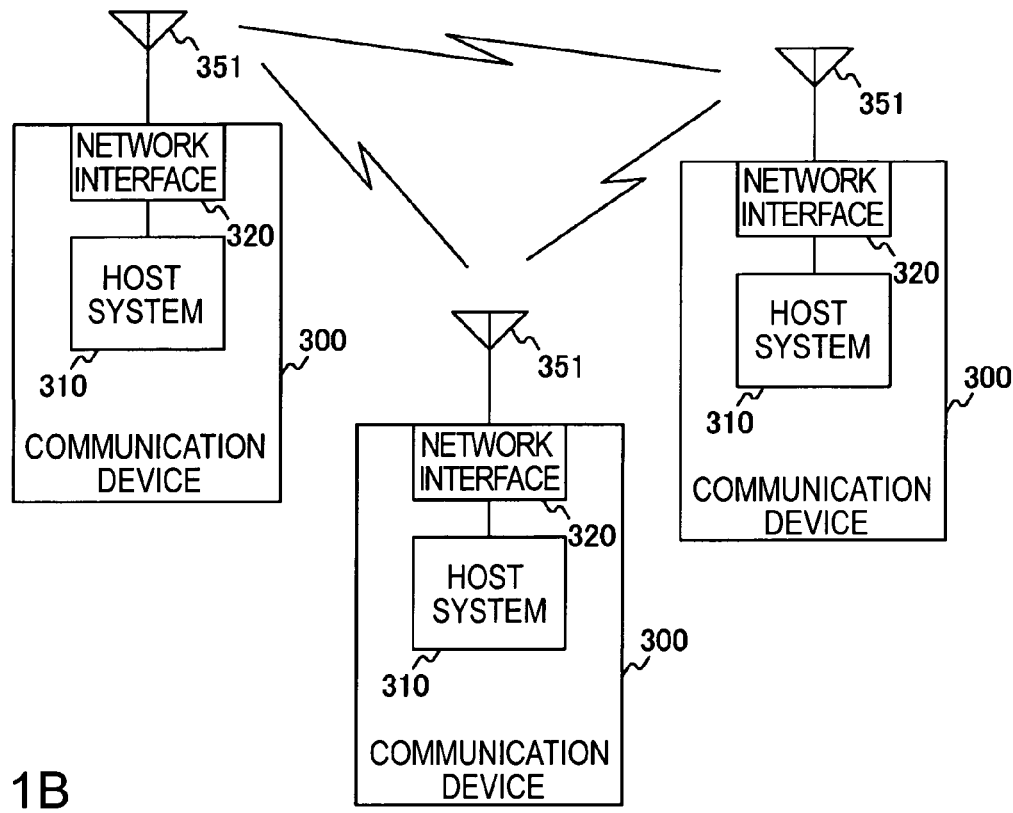
FIGS. 1A and 1B show examples of the configuration of a network system to which the present invention is applied.
Figure 1B:
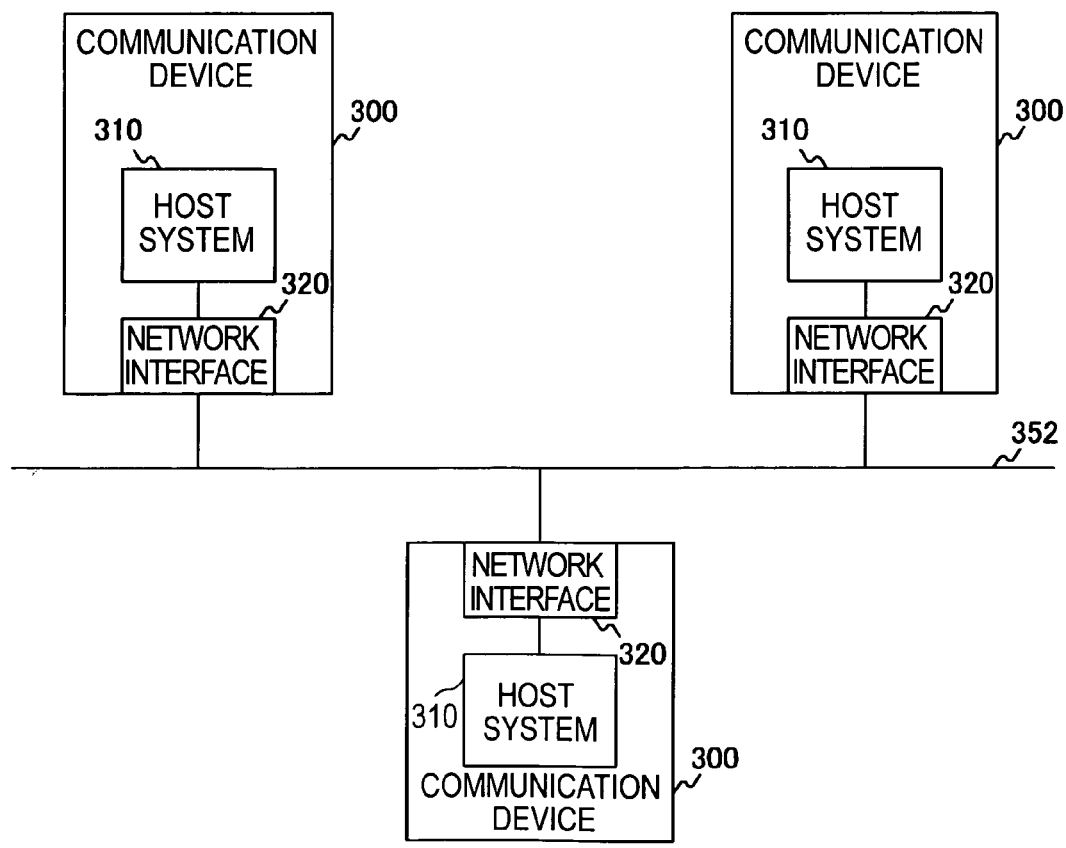

FIGS. 1A and 1B show examples of the configuration of a network system to which the present invention is applied. In the network system in which the present invention is applied, any of a wireless network and a wired network can be used as a network that serves as a platform.

FIG. 1A shows an example in which a wireless network is used as a network, and a network system is constructed using radio waves output from an antenna 351 connected to a communication device 300. The communication device 300 includes a network interface 320 connected to the antenna 351 and a host system 310 connected to the network interface 320. The network interface 320 performs processing related to the data link layer (the 2nd layer) or lower in an OSI reference model, and is realized by the form of, for example, a network card. The host system 310 performs processing related to the network layer (the 3rd layer) or higher in the OSI reference model, and is realized by the form of, for example, a microcomputer system.

FIG. 1B shows an example in which a wired network is used as a network, and a network system is constructed as a result of a communication device 300 being connected to a bus 352. Also in this case, similarly to the case of FIG. 1A, the communication device 300 includes a network interface 320 connected to the bus 352, and a host system 310 connected to the network interface 320.

Figure 2:
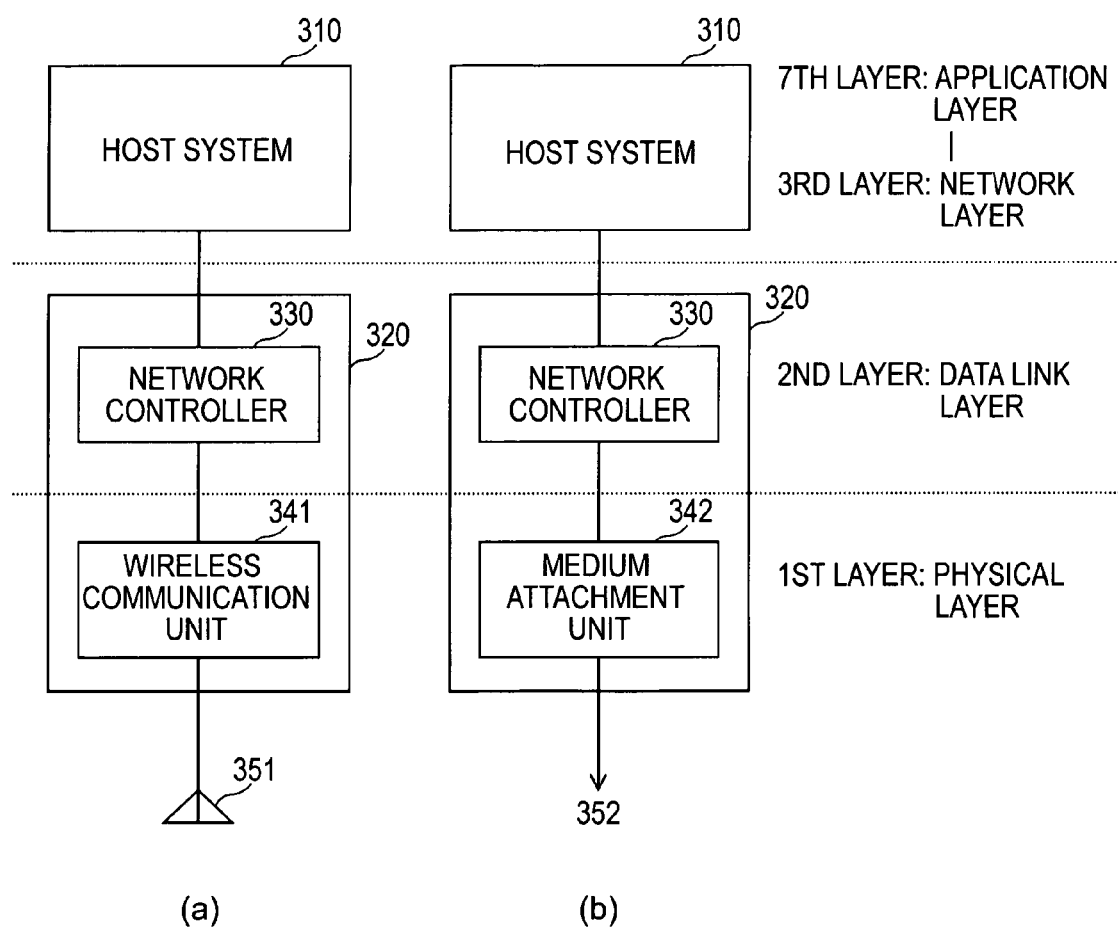
FIG. 2 shows an example of the configuration of a communication device 300 according to an embodiment of the present invention.

FIG. 2 shows an example of the configuration of the communication device 300 according to the embodiment of the present invention. Part (a) of FIG. 2 shows an example in which a wireless network is used as a network, and a network interface 320 includes a network controller 330 and a wireless communication unit 341. In this example, it is assumed that the network controller 330 performs processing for the data link layer (the 2nd layer) in the OSI reference model and that the wireless communication unit 341 performs processing for the physical layer (the 1st layer) in the OSI reference model.

Part (b) of FIG. 2 shows an example in which a wired network is used as a network, and the network interface 320 includes a network controller 330 and a medium attachment unit 342. In this example, it is assumed that the network controller 330 performs processing for the data link layer (the 2nd layer) in the OSI reference model, and the medium attachment unit 342 performs processing for the physical layer (the 1st layer) in the OSI reference model.

That is, the two networks differ in that, in the case of the wireless network, the wireless communication unit 341 is used, and in the case of the wired network, the medium attachment unit 342 is used, but the network controller 330 for performing the processing for the data link layer can be used in both of them.

The host system 310 that performs processing related to the network layer (the 3rd layer) or higher can be configured so as not to be dependent on the physical configuration of the network. More specifically, processing based on high-order protocols, such as an IP protocol, a TCP protocol (Transmission Control Protocol), a UDP protocol (User Datagram Protocol), or an HTTP protocol (Hyper Text Transfer Protocol), is implemented by an OS (Operating System) or an application.

Figure 3:
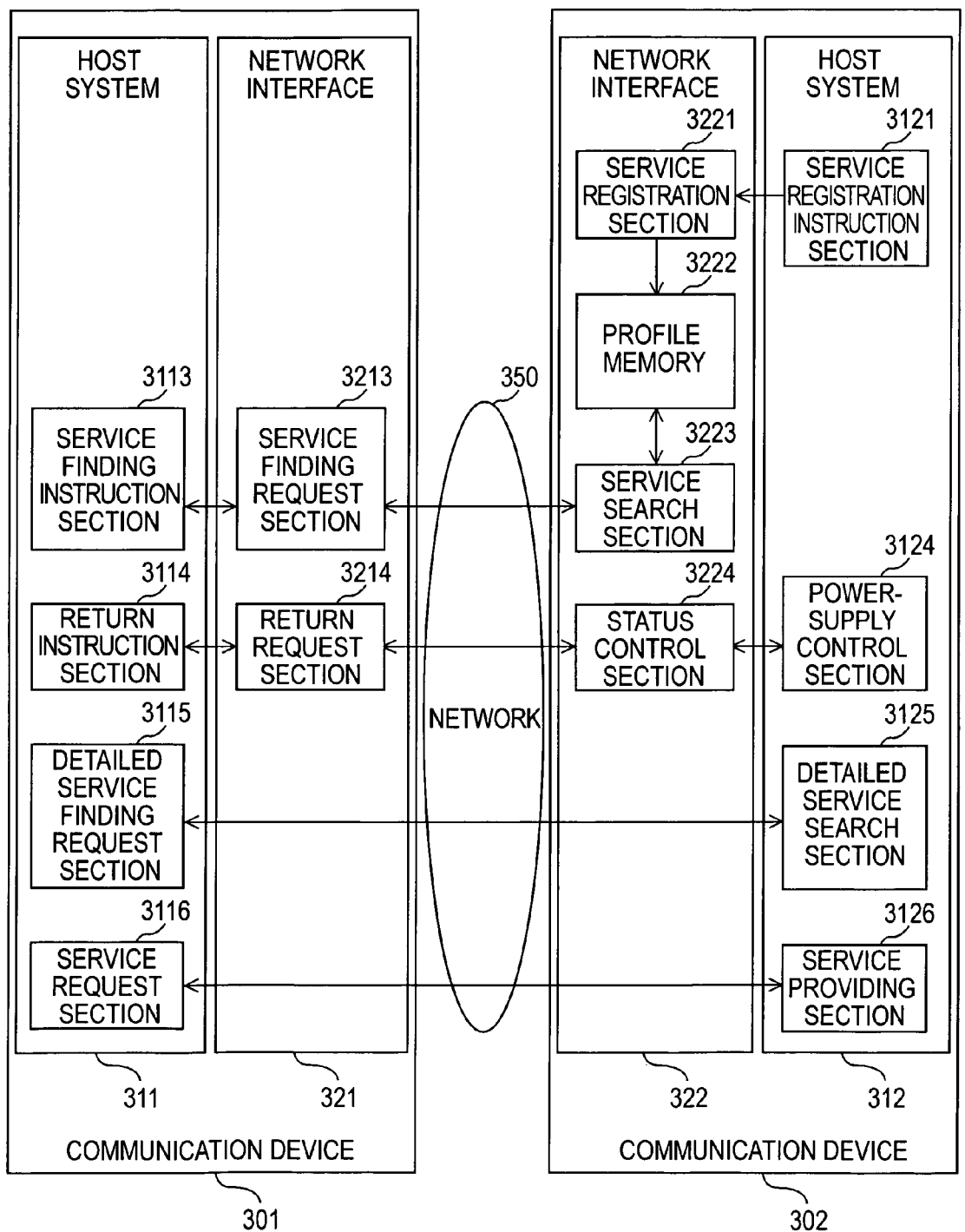
FIG. 3 shows an example of the structure of functions of the communication device according to the embodiment of the present invention.

FIG. 3 shows an example of the structure of functions of a communication device according to the embodiment of the present invention. Here, portions corresponding to the case in which two communication devices 301 and 302 are connected in a network 350 are taken up and described. That is, in FIG. 3, since the structure of the functions that are necessary when the communication device 301 requests services and the communication device 302 provides the services is shown, they are asymmetrical. However, in practice, they can be configured symmetrically so as for each communication device to have the same functions.

Similarly to the communication device 300, the communication devices 301 and 302 include host systems 311 and 312, and network interfaces 321 and 322, respectively. In the host system 311, the communication device 301 requesting services includes a service finding instruction section 3113, a return instruction section 3114, a detailed service finding request section 3115, and a service request section 3116. The communication device 301 includes, in the network interface 321, a service finding request section 3213 and a return request section 3214. The communication device 302 for providing services includes, in a host system 312, a service registration instruction section 3121, a power-supply control section 3124, a detailed service search section 3125, and a service providing section 3126. The communication device 302 includes, in a network interface 322, a service registration section 3221, a profile memory 3222, a service search section 3223, and a status control section 3224. This registration of services can be realized by, for example, API (Application Program Interface) provided by the network interface 322.

On the assumption that the network interface 322 is in an operable state, the registration of services can be performed at various timings as described below. First, the registration is possible when the host system 312 becomes able to provide services as when a server application is started up. Furthermore, on the assumption that the host system 312 provides predefined services, the registration is possible when the host system 312 is started up. In addition, on the assumption that the communication device 302 provides predefined services, the registration is possible before the communication device 302 is shipped. That is, this registration process can be performed any time before an inquiry is made to the network interface 322. As a result of providing the profile memory 3222 in the form of, for example, a ROM or as a result of performing setting of making change impossible, the content of the registered services may also be fixed so as not to be changed.

The service finding instruction section 3113 performs instructions for finding services. These instructions of finding services can be realized by, for example, API provided by the network interface 321. In response to the instruction from the service finding instruction section 3113, the service finding request section 3213 outputs a protocol for finding services via a network 350 by broadcast or multicast. This service finding protocol contains a service profile (to be described later) as conditions for services to be found.

The service search section 3223 receives the service finding protocol that is broadcast or multicast by the service finding instruction section 3113, and performs a search as to whether the condition inquired by the service finding protocol matches the service profile held in the profile memory 3222. When it is determined that there is a match, the service search section 3223 outputs, by unicast, a response protocol to the communication device 301 that has made the inquiry via the network 350. On the other hand, when it is determined that there is no match, the service search section 3223 discards the received service finding protocol and responds nothing.

When the communication device 302 stops the provision of particular services, this can be dealt with by deleting the corresponding area of the profile memory 3222. When the profile memory 3222 is fixed using a ROM, etc. in the manner described above, measures, such as the service search section 3223 temporarily ignoring an inquiry about the corresponding services with respect to an external inquiry, may be adopted.

The status control section 3224 controls the operating state of the host system 312, that is, as to whether it is in a wake state or in a standby status. For example, after the services are registered by the service registration section 3221 until the services are performed in practice, the host system 312 needs not always to be in a wake state. Therefore, by allowing the host system 312 to shift to a standby status by the status control section 3224, the power consumption in the host system 312 can be suppressed.

The power-supply control section 3124 controls the supply of power to each section in the host system 312 under the instructions from the status control section 3224. That is, the power-supply control section 3124 controls the status of the host system 312 by performing the power-supply control so that, when shifting from the wake state to the standby status, the power-supply level is decreased, and when shifting from the standby status to the wake state, the power-supply level is increased in order to control the status of the host system 312.

When the host system 312 of the communication device 302 is in a standby status, the return instruction section 3114 instructs the host system 312 to return the wake state. This instruction of shifting the state can be realized by, for example, API provided by the network interface 321. In accordance with the instruction from the return instruction section 3114, the return request section 3214 requests the communication device 302 to return the host system 312 to the wake state. In response to the request from the return request section 3214, the status control section 3224 instructs the power-supply control section 3124 to shift the operating state of the host system 312 from the standby status to the wake state.

Regarding such a return request from the return request section 3214, the status control section 3224 can increase security level by performing a return process in accordance with only the instruction from a communication device having return authorization.

The detailed service finding request section 3115 requests the finding of detailed services as necessary. This service finding is not intended for the above-described service finding in the network interface 322, but requests the service finding in the host system 312. For example, when the processing for an IP layer at an order higher than the data link layer as a protocol hierarchy is necessary, the finding of detailed services is requested.

In response to the request from the detailed service finding request section 3115, the detailed service search section 3125 searches for the detailed services in the host system 312, and responds back the result to the detailed service finding request section 3115. The reason why the direct exchange at the level of the host system between the detailed service finding request section 3115 and the detailed service search section 3125 is possible as described above is that the status of the host system 312 is controlled so as to be placed in the wake state rather than in the standby status.

The service request section 3116 requests services so that services be provided by the communication device 302. The service providing section 3126 accepts the request from the service request section 3116 and provides predetermined services as the communication device 302. As described above, the protocol about the services is implemented in the host system at a higher order.

Also, as regards such service request from the service request section 3116, similarly to the above-described case of the return request, the security level can be increased by the service providing section 3126 by performing the subsequent processing in accordance with only the instructions from a communication device having authorization.

Figure 4:
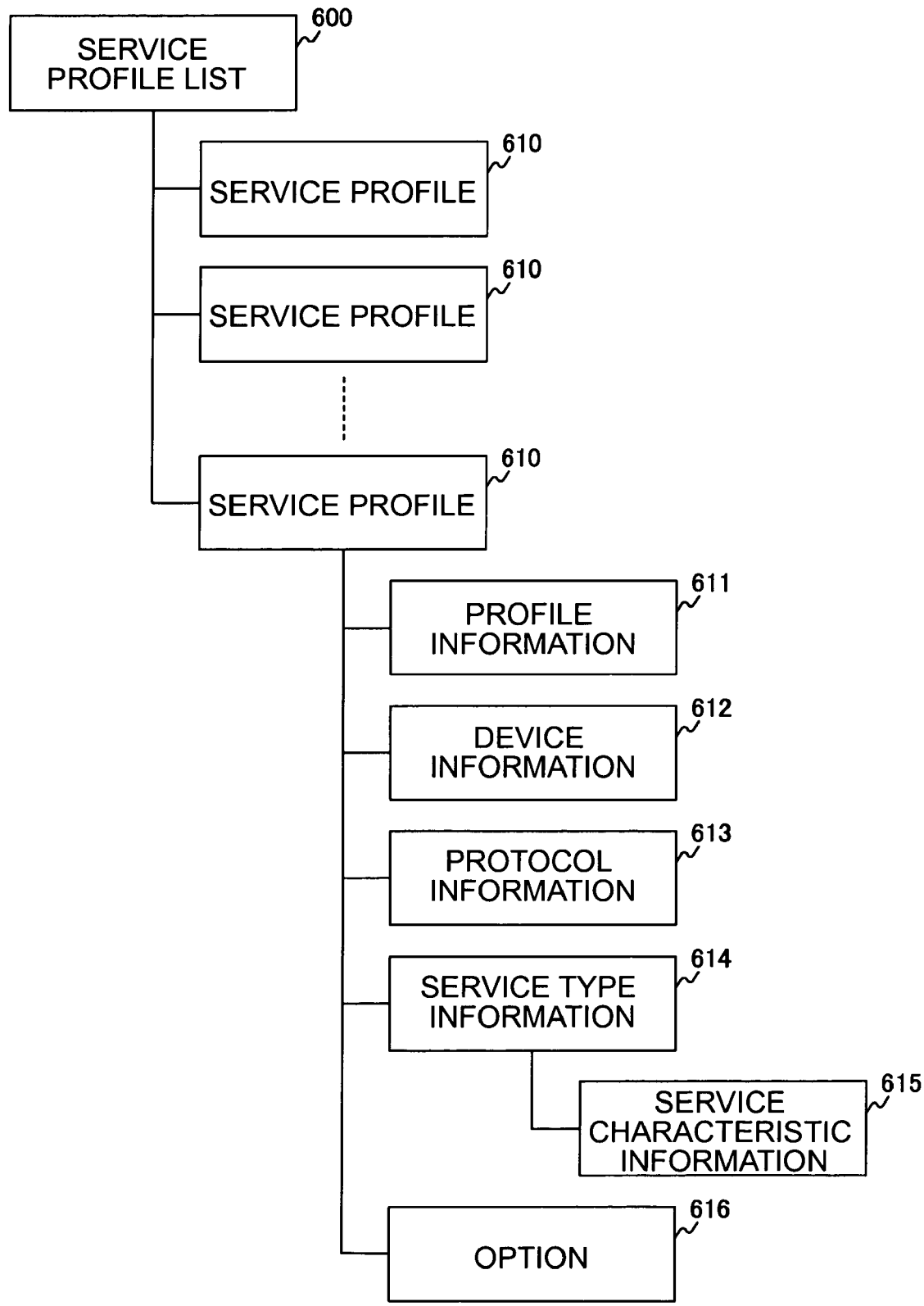
FIG. 4 shows a service profile that is held in a profile memory 3222 or that is contained in a service finding protocol according to the embodiment of the present invention.

FIG. 4 shows a service profile that is held in the profile memory 3222 or that is contained in the service finding protocol according to the embodiment of the present invention. The "service profile" is data in which the attributes of the communication device, that is, the characteristics or the services that can be provided, are abstracted and arranged compactly.

A plurality of service profiles 610 can exist, and a collection of a plurality of service profiles 610 is called a "service profile list 600". Each of the service profiles 610 includes profile information 611, device information 612, protocol information 613, service type information 614, service characteristic information 615, and an option 616.

The profile information 611 is information about the profile itself, and as to what kind of information is contained is defined. For example, the version number of the profile can be indicated.

The device information 612 holds information about the type of the communication device. For this type, for example, as a service providing format, distinctions are made as to whether the device is a device for outputting data, a device for receiving data, or a device for receiving data and for converting and outputting the data. Furthermore, distinctions are also made according to the characteristics as the entire device such that the device is a standing device or a device that is supposed to be carried. In addition, information about whether the device is a device to which power is supplied externally or a battery operated device is also indicated here.

The protocol information 613 holds the information of the protocol supported by the communication device for providing services. As such a protocol, for example, information about whether the protocol is a protocol by which processing is performed in the data link layer or the protocol is a protocol by which processing is performed in the network layer can be indicated. This makes it easy to search for services matching the specification of the system.

The service type information 614 holds the type in which services provided by the communication device are abstracted, that is, information about the large category of the services. As a result, it is possible to know the outline about what can be performed by the communication device. Representations that cannot be shown singly by the service type information 614 can be defined by the other items and a plurality of specifications. For example, for the television, the service type information 614 of "moving image" is represented as a profile having device information 612 of a "data receiving service providing device", and the service type information 614 of "audio" is represented as a profile having device information 612 of a "data receiving service providing device".

The service characteristic information 615 holds specific information in the items specified by the service type information 614, that is, information about the small category of the services. service finding with higher accuracy is made possible by supplementing the services type by the service characteristic information 615. Items appropriate for the service characteristic information 615 are provided for each piece of the service type information 614.

The option 616 can hold optional items when services are provided. For example, the wake state of the host system, which is necessary to provide services, a port number, etc., may be included.

FIG. 5 shows an example of the configuration of the service profile 610 according to the embodiment of the present invention. In this service profile 610, each piece of the information described thus far is assigned to each bit and is defined. For example, in the case of the device information 612, the type of the device, such as whether a data output service providing device for outputting data, a data receiving service providing device for receiving data, a data conversion service providing device for receiving data and for converting and outputting the data, or a battery driven device that operates by battery, is represented by each bit.

As a result of structuring the service profile 610 in this manner, when compared to the case in which it is defined by, for example, an XML format, the storage size in the profile memory 3222 can be reduced. Furthermore, when the service profile held in the profile memory 3222 is compared with the service profile included in the service finding protocol, the comparison can be performed in a format as is, and therefore, service search can be performed easily.

Each bit needs not always to have a one-to-one correspondence with each item, and the bits may be encoded every plural bits according to a necessary number of bits, and may be used.

FIG. 6 shows the service type information 614 and the service characteristic information 615 of the service profile 610 according to the embodiment of the present invention. As described above, the service type information 614 indicates the large category of the services, and the service characteristic information 615 indicates the small category. Here, as the service type information 614, "audio", "control", "data", "still image", "moving image", "network", and "application" are indicated.

"Audio" indicates services about an audio format of music, etc. In this case, for the service characteristic information 615, a format, such as "ATRAC3plus" and "MP3", is specified. "Control" indicates services about the input or output of control. In this case, as the service characteristic information 615, whether the device is an "input control device" or an "output control device" is specified. "Data" indicates services about the data format of text data, binary data, etc. In this case, for the service characteristic information 615, the format of "text data" and "XML" is specified. "Still image" indicates services about the format of a still image. In this case, for the service characteristic information 615, the format of "JPEG" and "PNG" is specified. "Moving image" indicates services about the format of a "moving image". In this case, for the service characteristic information 615, the format of "MPEG1" and "WMV9" is specified. "Network" indicates network-associated services of a gateway and a router. "Application" indicates services associated with applications, such as a home theater and a game.

FIG. 7 is a sequence chart showing the flow of service finding according to the embodiment of the present invention. It is assumed here that a search of services is performed from a communication device 301 to other communication devices 302 and 303.

Initially, when there is an instruction of requesting service finding from the host system of the communication device 301 (step S811), the network interface of the communication device 301 broadcasts or multicasts a service finding protocol for requesting service finding (step S812). This service finding protocol is received by the other communication devices 302 and 303.

The communication devices 302 and 303 receiving the service finding protocol search for the service profile registered in the profile memories, respectively (steps S814 and 815). When the services matching the conditions are found, the communication devices 302 and 303 output, by unicast, a response protocol to the communication device 301 (steps S815 and 816). Here, although an example in which the conditions match between the communication devices 302 and the 303 is shown, the service finding protocol is ignored when the conditions do not match. This response protocol is received in the network interface of the communication device 301 (steps S817 and 818).

As described above, the response for the service finding protocol is performed by unicast rather than by broadcast or multicast. As a result, the wasted consumption of power and the wasted communication bandwidth by the broadcast and the multicast can be avoided. This fact is particularly useful to avoid the relay between hubs in the wired network and multihop in the wireless ad hoc network from being wasted.

Figure 8:
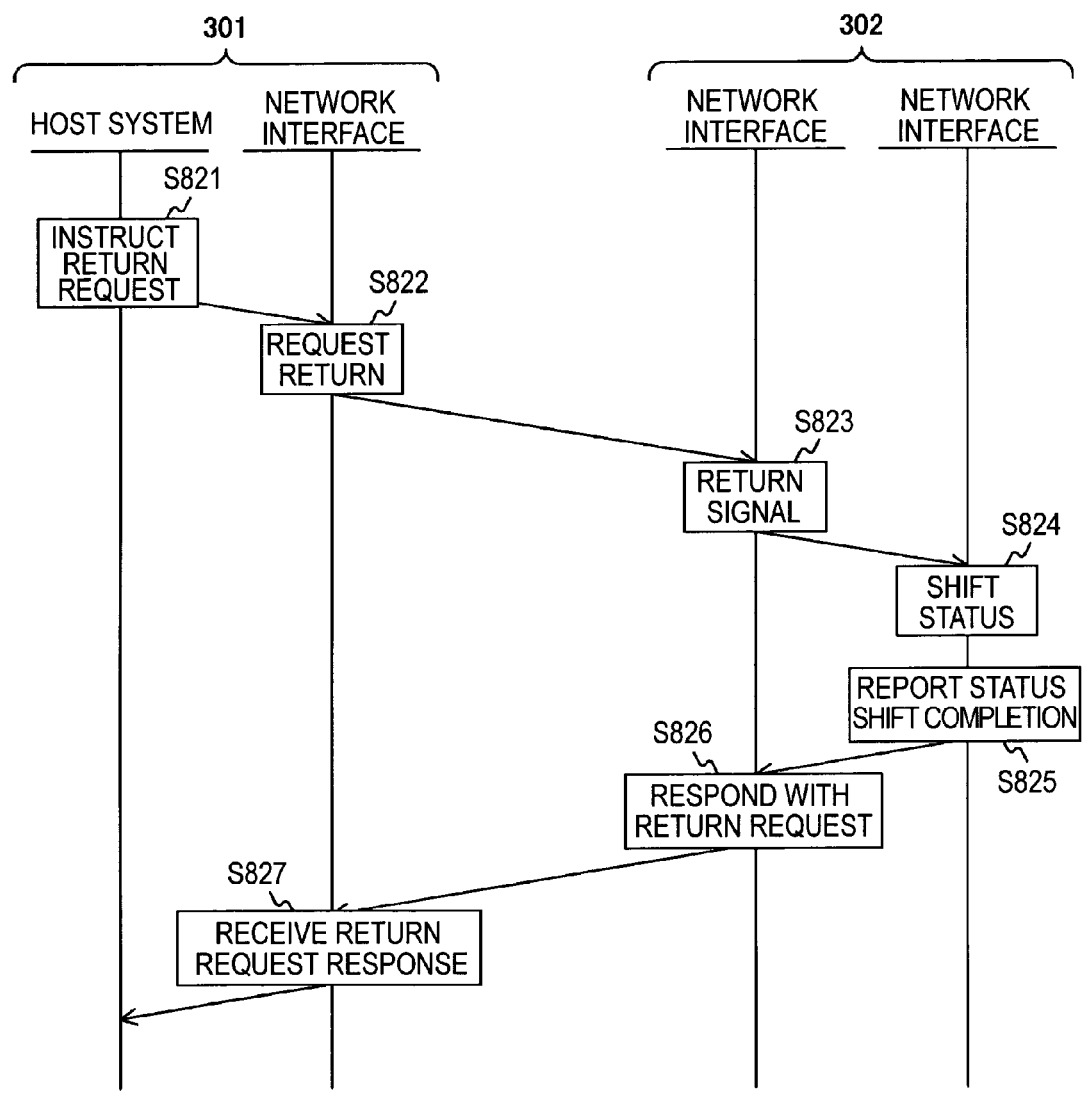
FIG. 8 is a sequence chart showing the flow of a return request according to the embodiment of the present invention.

FIG. 8 is a sequence chart showing the flow of a return request according to the embodiment of the present invention. It is assumed here that the communication device 301 requests the other communication device 302 to shift the operating state from the standby status to the wake state.

Initially, when there is an instruction of requesting a return from the host system of the communication device 301 (step S821), the network interface of the communication device 301 transmits a protocol for requesting the return of the operating state (step S822). This return request protocol is received by the network interface of the communication device 302.

The communication device 302 receiving the return request protocol outputs a return signal to the host system from the network interface (step S823). The host system receiving this return signal returns the operating state from the standby status to the running status (step S824). Then, the host system reports the fact that the status shift is completed to the network interface (step S825). Upon reception of this report, the network interface sends back a response for the return request from the communication device 301 (step S826).

When the network interface of the communication device 301 receives the return request response from the communication device 302, the network interface reports the fact to the host system (step S827). As a result, the host system of the communication device 301 recognizes that the host system of the communication device 302 has shifted to the running status in which services can be provided.

Next, a description is given of an example of the construction of a system in which the communication device according to the embodiment of the present invention is used.

Figure 9:
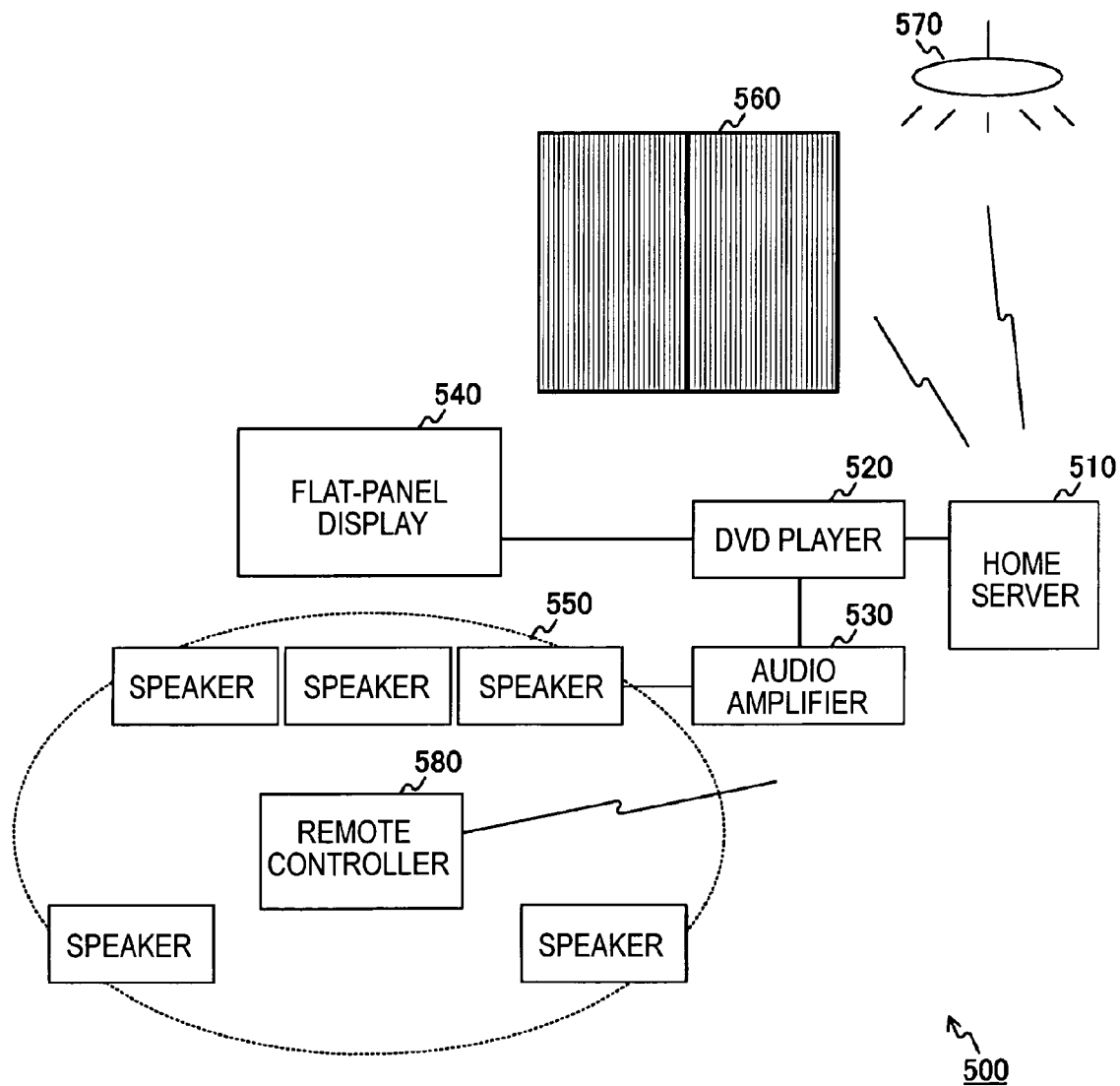
FIG. 9 shows an example of the configuration of a home theater system 500 according to the embodiment of the present invention.

FIG. 9 shows an example of the configuration of a home theater system 500 according to the embodiment of the present invention. The home theater system 500 includes a home server 510, a DVD player 520, an audio amplifier 530, a flat-panel display 540, a surround speaker 550, a light-shielding curtain 560, an illumination 570, and a remote controller 580. These devices include the communication device 300 described with reference to FIG. 1, or are connected to such a communication device 300 so as to communicate with the other devices. The surround speaker 550 functions to output audio data supplied from another device. The light-shielding curtain 560 is a curtain for controlling the opening and closing in response to a request from another device. The illumination 570 is an illumination for controlling the luminance in response to a request from another device. The remote controller 580 is a remote controller for allowing another device to perform processing.

Figure 10:
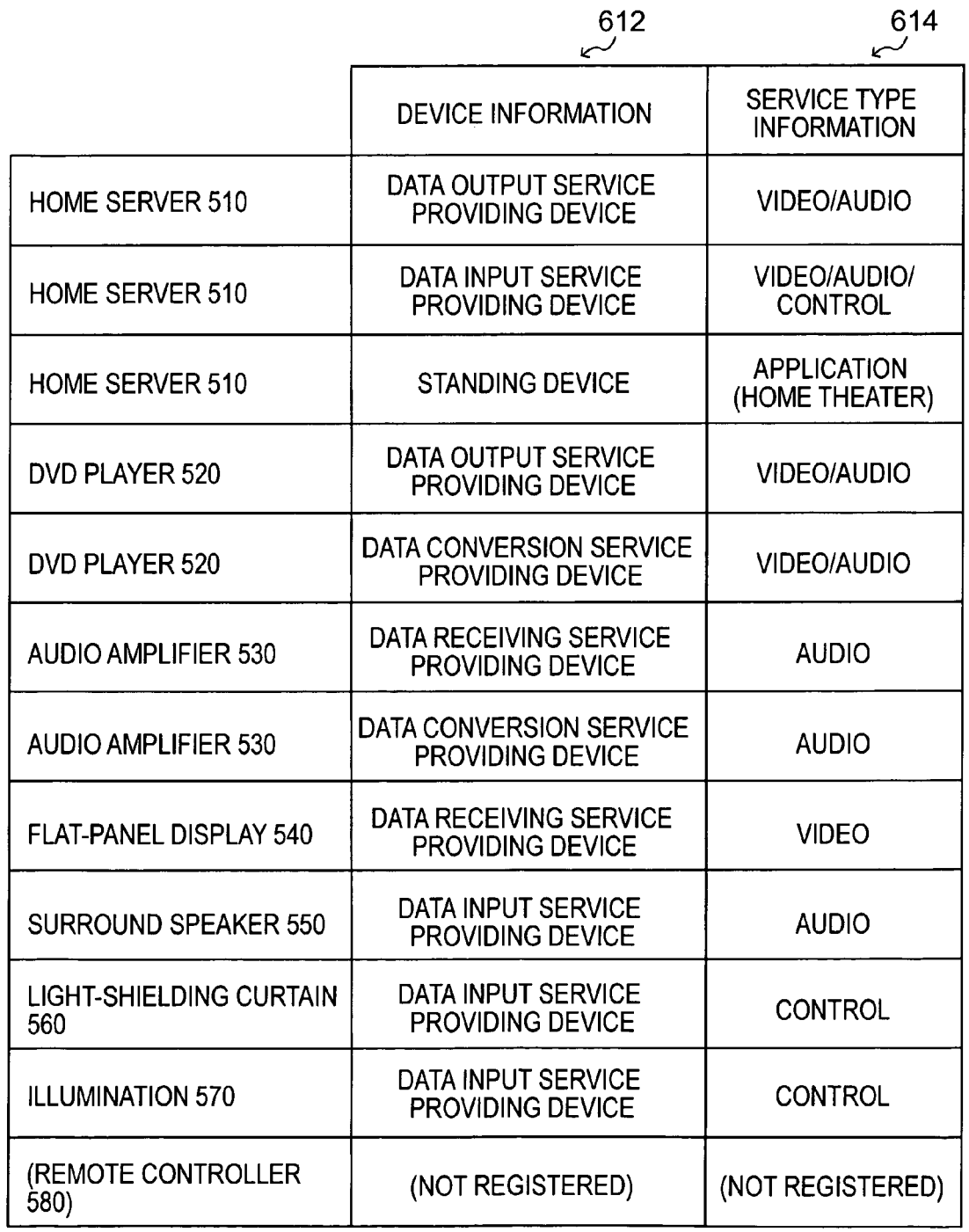
FIG. 10 shows an example of the service profile of each device in the home theater system 500 according to the embodiment of the present invention.

FIG. 10 shows an example of the service profile of each device in the home theater system 500 shown in FIG. 9. Here, for the sake of simplicity, only the device information 612 and the service type information 614 within the service profile 610 are shown.

The home server 510 has attributes of a "data output service providing device for supporting video, audio, or control", a "data input service providing device for supporting video, audio, or control", and a "standing device for supporting applications of a home theater. These are defined as separate service profiles. If the application specified in the service profile can be uniquely identified as the specification of the service profile, it can be defined when the specification of the service profile is formulated.

The registration of the service profile is performed when the home theater server application that is executed after the start-up of the basic system of the home server is started. It is assumed that the device, such as the home server 510, can register and delete a plurality of functions regardless of the implementation form of hardware and software. A service profile that cannot be determined immediately after the main power-supply is switched on is registered when the services becomes possible to be provided, and the service profile is deleted when the services can no longer be provided.

The DVD player 520 has attributes of a "data output service providing device for supporting video or audio" or a "data conversion service providing device for supporting video or audio". The registration of the service profile is performed when the supply of power to the DVD player 520 is started and the main power-supply of the device is switched on. As a result, even if the DVD player 520 is placed in a standby status later, the service profile registered in the network interface can be searched for as a result of the network interface of the DVD player 520 continuing operation.

The audio amplifier 530 has attributes of a "data receiving service providing device supporting audio" and a "data conversion service providing device supporting audio". The registration of the service profile is performed when the supply of power to the audio amplifier 530 is started and the main power-supply for the device is switched on.

The flat-panel display 540 has attributes of a "data receiving service providing device supporting video". The registration of the service profile is performed when the supply of power to the flat-panel display 540 is started and the main power-supply for the device is switched on.

The surround speaker 550 has attributes of a "data input service providing device supporting audio". When the functions are not changed later as in the surround speaker 550 or when the manufacturer does not want to change the services, the content can be fixed by registering the service profile before shipment from the factory and by specifying the setting of service profile change incapability in the profile memory of the network interface so that the services are not changed during operation.

Both the light-shielding curtain 560 and the illumination 570 have attributes of a "data input service providing device supporting control". The registration of the service profile is performed when the supply of power to the light-shielding curtain 560 and the illumination 570 is started and the main power-supply for the devices is switched on.

Since the remote controller 580 is not a device for providing services, but is a device for only receiving services, the registration of the service profile is not performed. The service profile needs only to be registered when the device for providing services wants another device in the network to find the services. This fact means that, when the service profile is not registered even if the device is connected to the network, it will not be found by using this scheme.

The description of these service profiles is only an example, and the content of the service profile needs only such that each item be uniquely identified when the description specification is formulated. In other words, it is important that, when a search is performed using specific data, the item can be detected by the algorithm defined by the service profile, and it is not important by which name the content of the item that can be uniquely specified is specifically called.

On the assumption of these service profiles, the home theater system 500 of FIG. 9 is operated by, for example, scenario described below. First, when the user executes the function of movie enjoyment using the remote controller 580, the movie enjoyment application of the remote controller 580 starts to find the device necessary for movie enjoyment. Then, a response is sent back from the flat-panel display 540, the DVD player 520, and the home server 510.

When the user selects the home server 510, the application of the home server 510 starts operating to start service finding for performing a higher level of setting. A response is sent back from the flat-panel display 540, the audio amplifier 530, the light-shielding curtain 560, and the illumination 570. When the application of the home server 510 inquires the more detailed structure to the application of the audio amplifier 530, the application of the audio amplifier 530 starts service finding for finding a speaker. Then, a response is sent back from the flat-panel display 540 and the surround speaker 550, and a selection is sent back to the application of the home server 510. The application of the home server 510 selects the surround speaker 550, and the preparations are completed.

When the user requests the title of a movie from the remote controller 580, titles of movies stored in the home server 510 are displayed on the screen of the remote controller 580. When the user selects one of the titles from the displayed list, the indication is reported to the home server 510.

Based on the information obtained by service finding, the home server specifies the decoder of the movie data as the DVD player 520, sets video output to the flat-panel display 540, sets audio reproduction to the audio amplifier 530, issues a closing instruction to the light-shielding curtain 560, and issues an instruction for decreasing the luminance of the illumination 570. The data output from the home server 510 is transmitted to the DVD player 520, and the decoded data is transferred to the flat-panel display 540 and the audio amplifier 530. The audio amplifier 530 decodes the audio stream to a format by which the surround speaker 550 can play back, and transfers it to each speaker of the surround speaker 550.

When the user selects a pause using the remote controller 580, processing, for example, the indication is sent to the home server 510, and an instruction for increasing the luminance of the illumination 570 is transmitted from the home server 510 to the illumination 570, can be performed.

Such service finding processing and processing for holding information singly by each device make it possible to realize the home theater system 500 by simple operation of the remote controller 580.

Next, the operation of the communication device according to the embodiment of the present invention is described with reference to the drawings.

Figure 11:
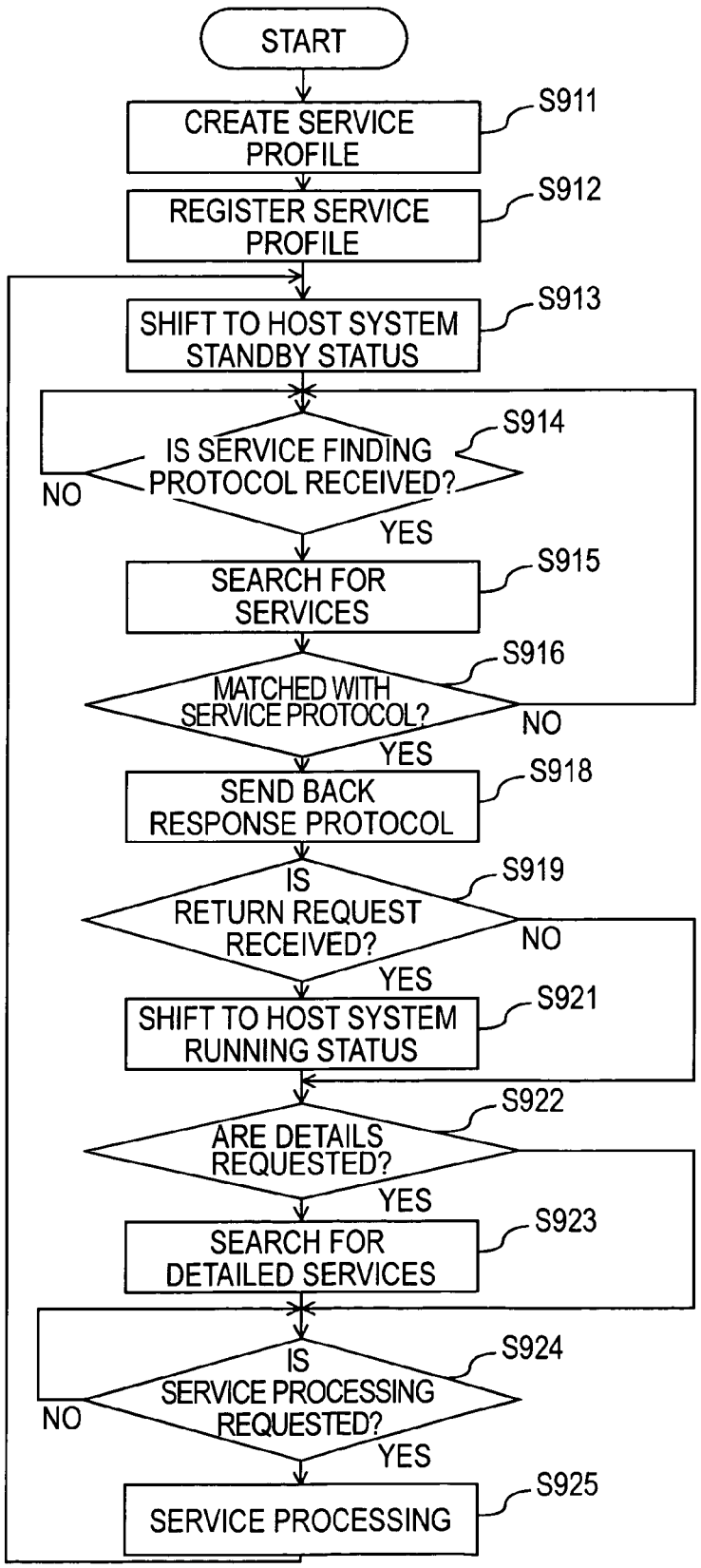
FIG. 11 shows the processing procedure of a communication device 302 on the service providing side according to the embodiment of the present invention.

FIG. 11 shows the processing procedure of the communication device 302 (FIG. 3) on the service providing side according to the embodiment of the present invention. Initially, when the service profile of the device is created (step S911), the service registration section 3221 registers the service profile memory 3222 in accordance with the instruction of the service registration instruction section 3121 (step S912). Thereafter, the host system 312 of the communication device 302 is able to shift to the standby status (step S913). This status shift is not always necessary, but when there is no other processing to be performed, shifting to the standby status suppresses the power consumption more than in the running status. This status shift is performed by the power-supply control section 3124 in accordance with the control of the status control section 3224.

Thereafter, when the service search section 3223 receives a service finding protocol from another communication device (step S914), the service search section 3223 searches for the service profile held in the profile memory 3222 (step S915). Then, if the condition contained in the service finding protocol matches the service profile held in the profile memory 3222 (step S916), the service search section 3223 sends back a response protocol to the other communication device (step S918). On the other hand, if a matching service profile is not found in step S916, the service search section 3223 ignores the service finding protocol and waits for the next service finding protocol to be received (step S914).

When the status control section 3224 receives a return request protocol from another communication device (step S919), the status control section 3224 controls the power-supply control section 3124 so that the operating state of the host system 312 from the standby status to the running status. In response, the power-supply control section 3124 shifts the operating state of the host system 312 from the standby status to the running status (step S921).

When the details service search section 3125 receives a service finding protocol requesting details service finding from another communication device (step S922), the details service search section 3125 searches for services at a hierarchy higher than the data link layer (step S923). Such services at a hierarchy higher than the data link layer correspond to, for example, UPnP by which services are performed in the IP layer.

Then, when the service providing section 3126 receives a request for services from another communication device (step S924), in response, the service providing section 3126 performs processing related to the services (step S925). Then, the host system 312 of the communication device 302 enters an idle state after all the processing related to the services is completed, and thereafter, the host system 312 of the communication device 302 becomes able to shift to the standby status (step S913).

Figure 12:
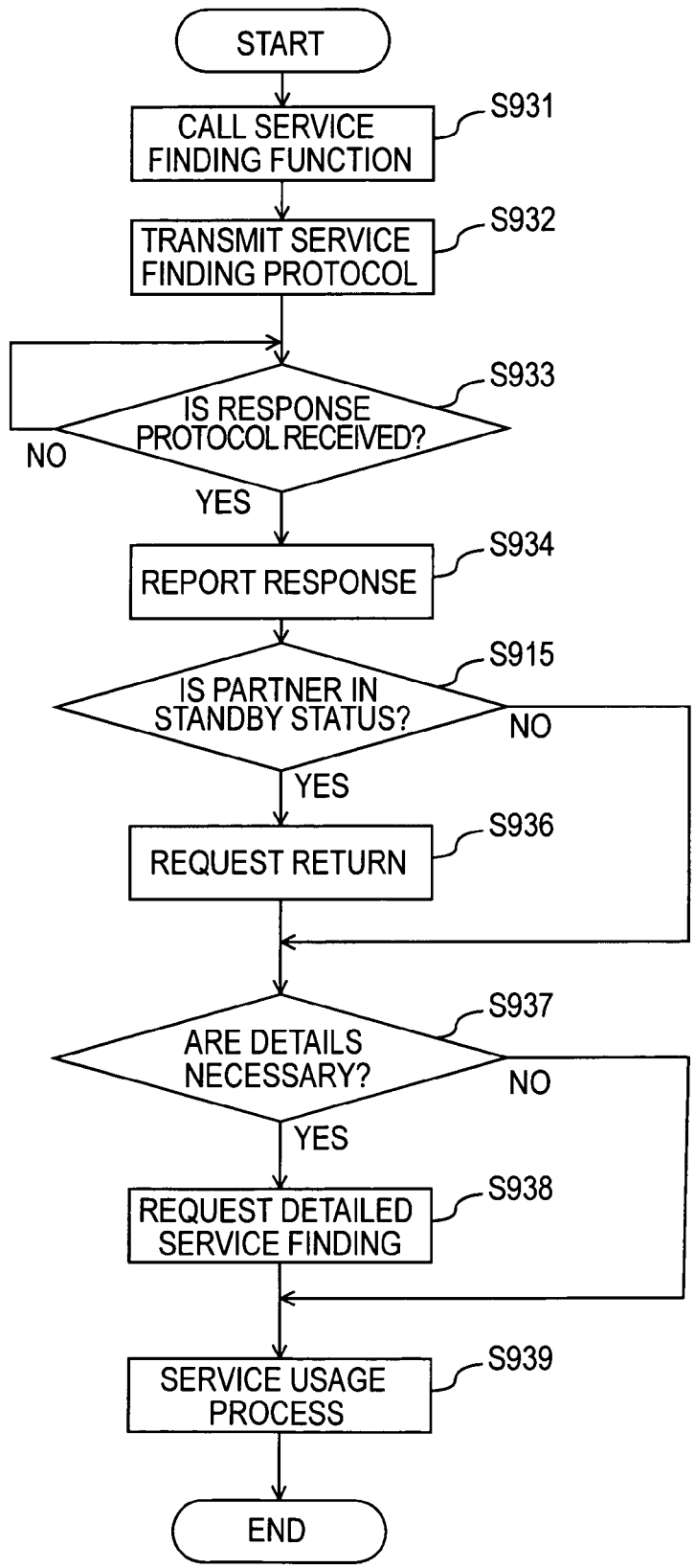
FIG. 12 shows the processing procedure of a communication device 301 on the service request side according to the embodiment of the present invention.

FIG. 12 shows the processing procedure of the communication device 301 (FIG. 3) on the service request side according to the embodiment of the present invention. Initially, when the service finding instruction section 3113 calls up a service finding function (step S931), the service finding request section 3 213 transmits a service finding protocol by broadcast or multicast (step S932).

Thereafter, when the service finding request section 3213 receives a response for the service finding protocol from the other communication device (step S933), the service finding request section 3213 reports the effect of the response to the service finding instruction section 3113 (step S934). At this time, the operating state of the host system can be informed from the communication device on the service providing side. As a result, when the operating state of the communication device on the service providing side is a standby status (step S935), in accordance with the instruction from the return instruction section 3114, the return request section 3214 requests the communication device on the service providing side to return the operating state of the host system from the standby status to the running status (step S936).

When the finding of the services at a hierarchy higher than the data link layer is necessary (step S937), the details service finding request section 3115 requests detailed service finding (step S938). For example, when UPnP is set in the protocol information 613 of the service profile 610, the details service finding request section 311 requests service finding using the UPnP protocol.

When the preparations for using services become ready as a result of these processes, the service request section 3116 requests services from the host system 312 of the communication device 302, and performs processing for using the services (step S939).

As described above, according to the embodiment of the present invention, the service profile 610 is registered in advance in the profile memory 3222 of the network interface 322, and the service search section 3223 searches for services in accordance with a request from another communication device. Thus, even if the host system 312 is at standby, the search for services can be performed by only the network interface 322.

In the format of the service profile 610, as a result of defining necessary information by being assigned to each bit, when compared to the case in which, for example, the XML format is adopted, the data size can be reduced, and processing by an XML parser, etc. can be obviated. Then, as a result of not only using the service profile 610 for service definition in the profile memory 3222 but also using it for the search condition in the service finding protocol, the search processing in the service search section 3223 can be made easier. Furthermore, also in the service finding instruction section 3113, the same format can be used between the service profile set in the network interface 321 in the same communication device 301 and the profile used for a search, and therefore, processing is made easier.

Next, another embodiment of the present invention will be described with reference to the drawings. In the embodiment described thus far, the network interface 322 unconditionally registers services in accordance with an instruction from the host system 312. With such an arrangement, flexibility such that not only the manufacturer of the communication device, but also, for example, a general user, can freely register new services can be offered. However, if any distinction is not provided between these services, so-called genuine services that are authorized and the other services coexist, presenting the risk in that an inconvenience may occur. Therefore, in the other embodiment of the present invention, the two services are registered by making distinctions, thereby further improving reliability with respect to the services that are provided.

Figure 13:
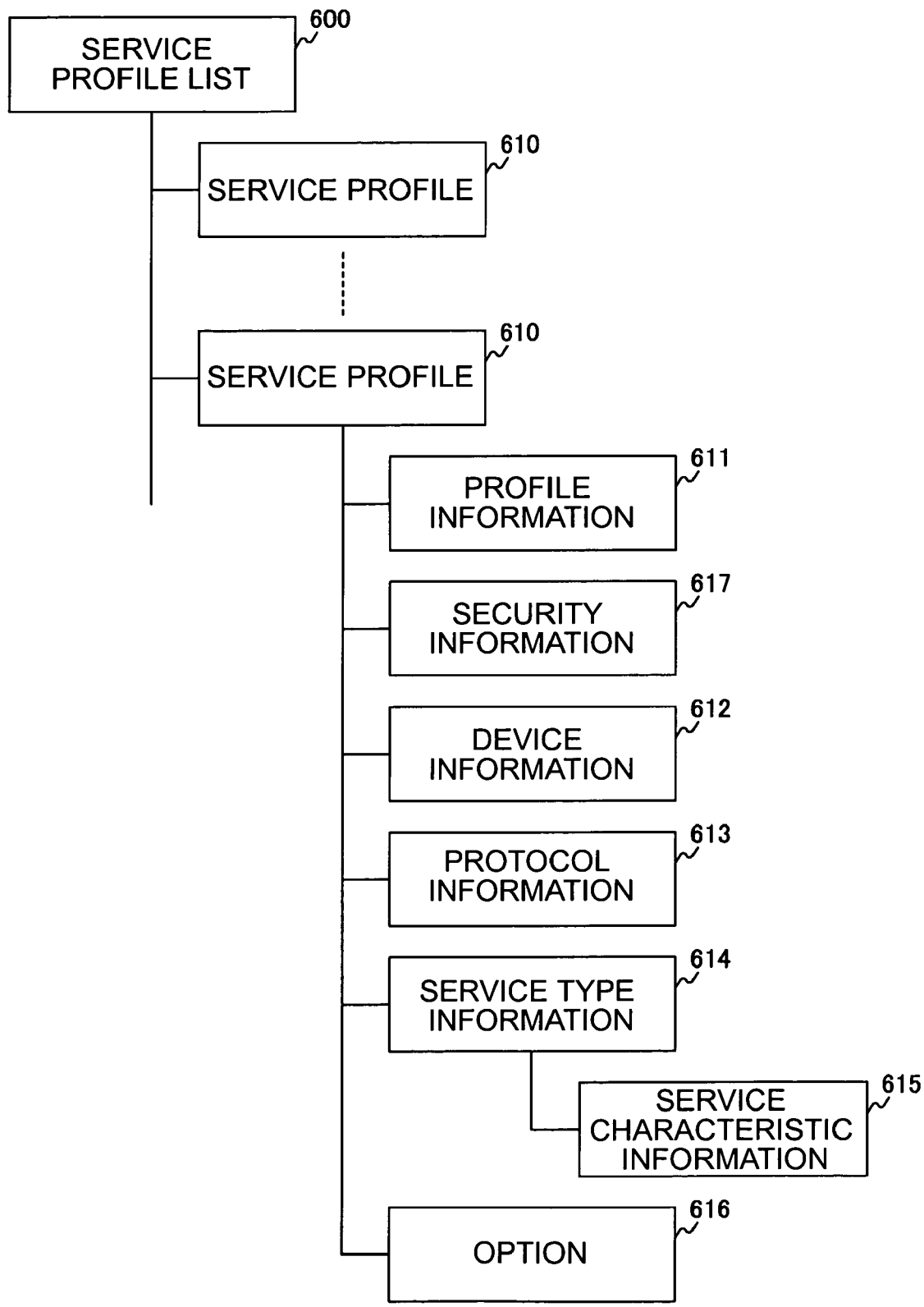
FIG. 13 shows another example of the service profile according to another embodiment of the present invention.

FIG. 13 shows another example of the service profile according to the other embodiment of the present invention. This service profile differs from the service profile of FIG. 4 in that security information 617 is added. The security information 617 is information indicating whether or not the content of the corresponding service profile 610 is permitted by a predetermined publisher, that is, the content is authorized.

In the service profile 610, the device information 612, the protocol information 613, the service type information 614, and the service characteristic information 615 are particularly called "function items".

Figure 14:
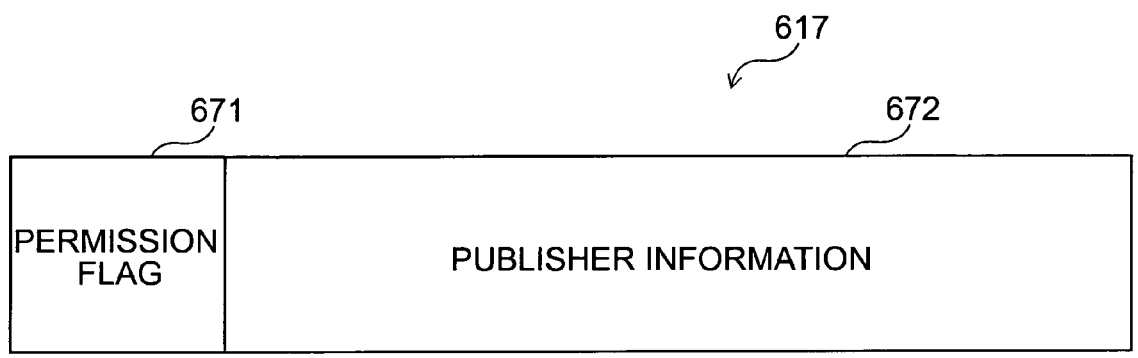
FIG. 14 shows an example of the structure of security information 617 according to the other embodiment of the present invention.

FIG. 14 shows an example of the structure of the security information 617 according to the other embodiment of the present invention. The security information 617 includes a permission flag 671 and publisher information 672. The permission flag 671 is a flag indicating whether or not the content of the corresponding service profile 610 has been permitted.

When the permission flag 671 indicates "with permission", the publisher information 672 holds the information relating to the publisher who have made the permission. For the publisher information 672, identification information capable of identifying the publisher, for example, a company name, can be used.

Figure 15:
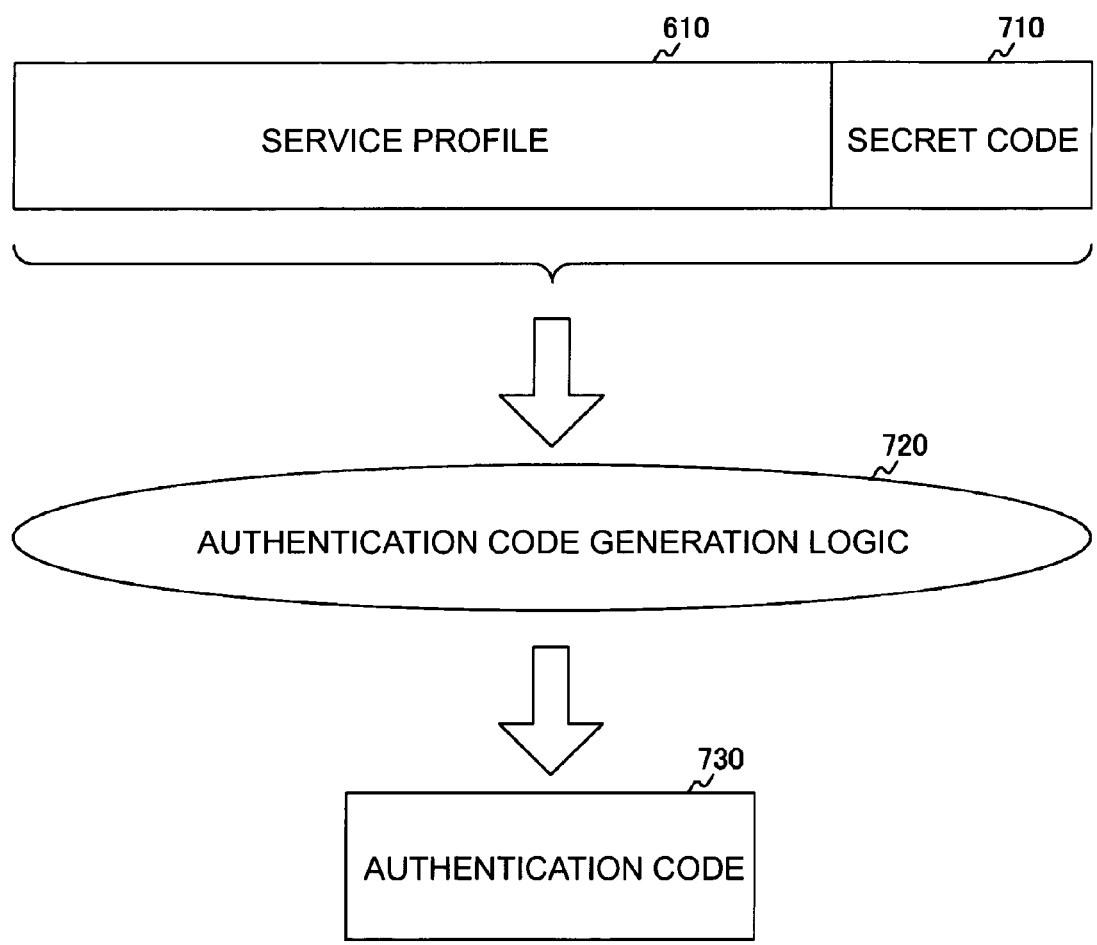
FIG. 15 shows an example of a step of generating authentication code 730 according to the other embodiment of the present invention.

FIG. 15 shows an example of a step of generating authentication code 730 according to the other embodiment of the present invention. In the other embodiment of the present invention, when the permission flag 671 of the security information 617 is set to "with permission" and the registration of services is performed, it is made to be a condition that a valid authentication code 730 is presented. The authentication code 730 is generated by a predetermined authentication code generation logic 720.

The authentication code generation logic 720 generates the authentication code 730 by performing a predetermined operation on the target service profile 610. Examples of the usable algorithm for implementing a predetermined operation include a hashed function such as SHA-1 (Secure Hash Algorithm 1) and an encryption method such as AES (Advanced Encryption Standard). These algorithms need only to match between the side where the authentication code is generated and the side where the authentication code is verified, and also, a plurality of algorithms may be used differently in synchronization between them.

When the authentication code 730 is generated, the authentication code generation logic 720 may perform a predetermined operation in such a manner that the secret code 710 is added to the service profile 610. This secret code 710 is an optional code, and the same code needs to be used between the side where the authentication code is generated and the side where the authentication code is verified. It is preferable that this secret code 710 be prestored in a secure memory in the network interface. As a result of using this secret code 710, even if the authentication code generation logic 720 is cracked, the authentication code cannot be generated without permission.

Figure 16:
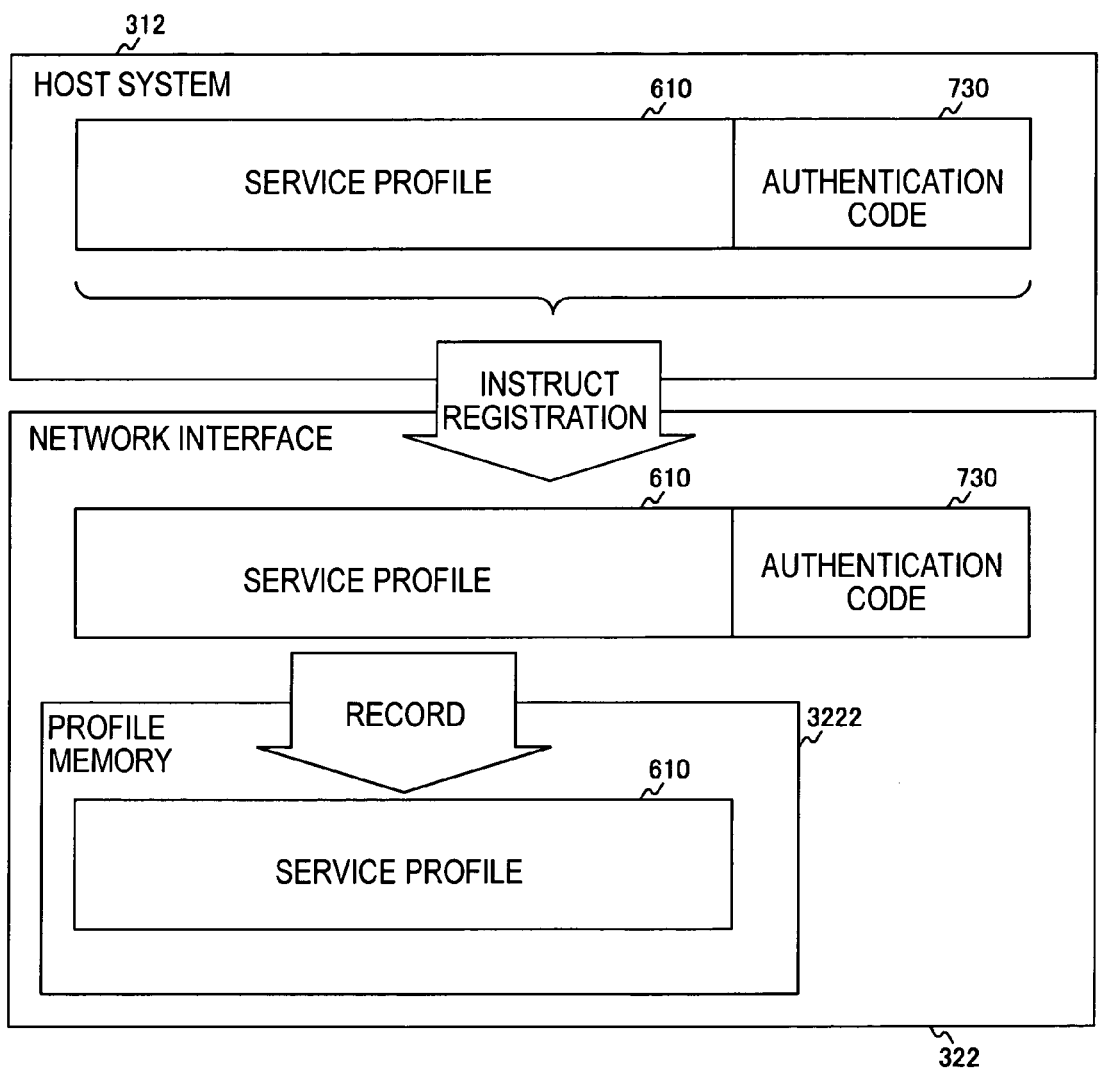
FIG. 16 shows an example of a step of registering the service profile 610 according to the other embodiment of the present invention.

FIG. 16 shows an example of a step of registering the service profile 610 according to the other embodiment of the present invention. When the registration of the service profile 610 in which the permission flag 671 indicates "with permission" is instructed from the host system 312, the network interface 322 verifies that the authentication code 730 that is presented simultaneously is valid.

An example of this verification method includes a method in which the authentication code for the service profile 610 is actually generated by the predetermined authentication code generation logic 720 in the network interface 322 in order to confirm a match with the presented authentication code 730. When they match, it can be verified that the authentication code 730 is valid. At this time, the secret code 710 can also be used in the manner described above.

When the verification that the authentication code 730 is valid is successful, the network interface 322 records the service profile 610 in the profile memory 3222.

Figure 17A:
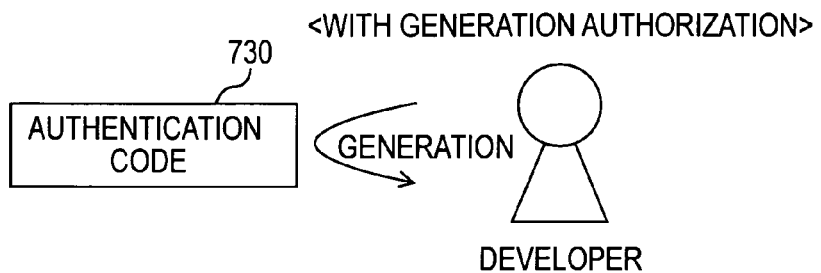
FIGS. 17A, 17B, and 17C show modes of generating and distributing the authentication code 730 according to the other embodiment of the present invention.
Figure 17B:
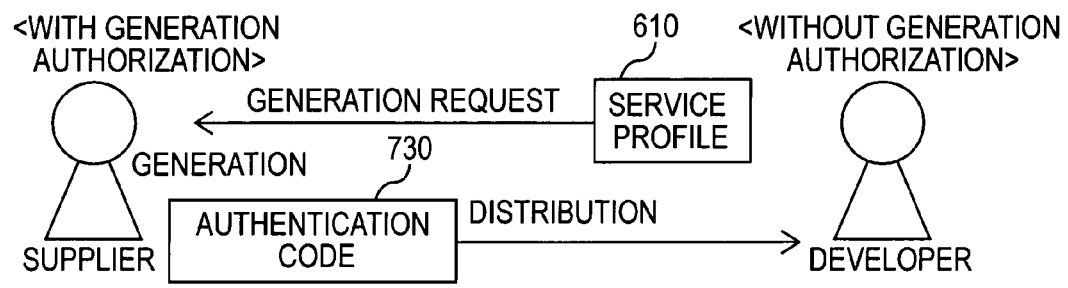
Figure 17C:
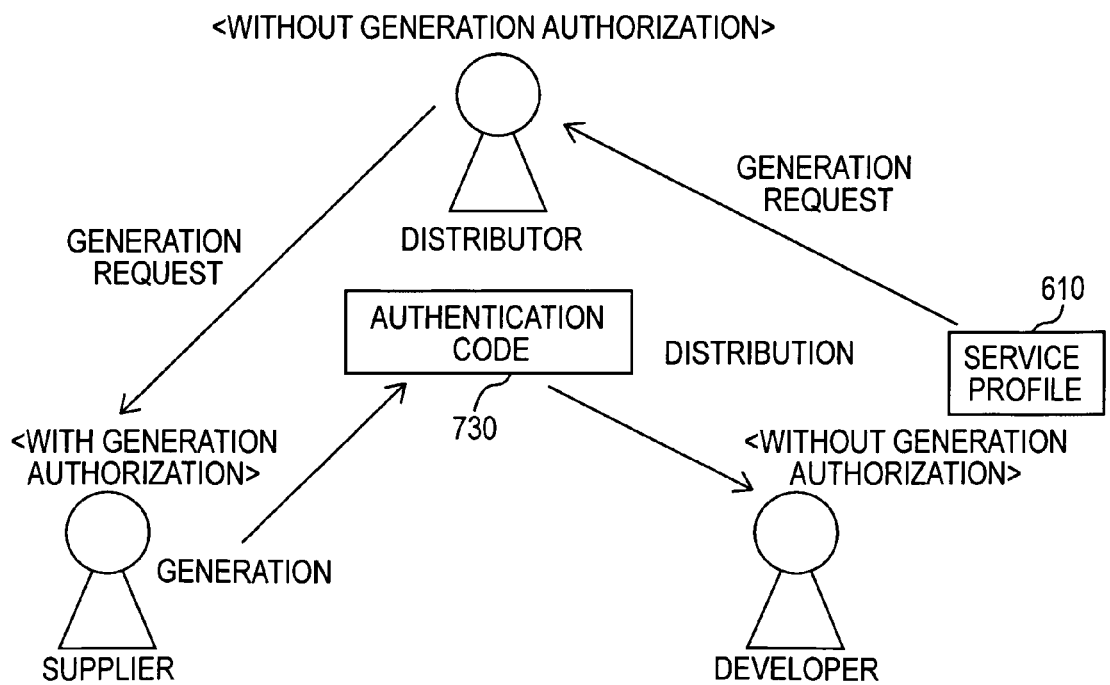

FIGS. 17A, 17B, and 17C show modes of generating and distributing the authentication code 730 according to the other embodiment of the present invention. FIG. 17A shows a mode in which the developer having generation authorization for the authentication code generates the authentication code 730 by himself/herself. When the developer himself/herself has generation authorization, the authentication code 730 can be generated singly in this manner.

FIG. 17B shows a mode in which the developer having no generation authorization for the authentication code requests the generation of the authentication code 730. The developer sends the created service profile 610 to the supplier so as to request the generation of the authentication code. The supplier generates the authentication code 730 by performing an authentication code generation logic on the received service profile 610. The authentication code 730 generated in this manner is distributed to the developer who is the requesting source.

FIG. 17C shows a mode in which a distributor is provided between the developer having no generation authorization for the authentication code and the supplier having generation authorization for the authentication code. In this case, the developer requests the distributor to generate an authentication code, and it is the supplier that actually generates the authentication code. After the supplier generates the authentication code 730, the supplier entrusts the distribution to the distributor. The distributor manages the authentication code and distributes the authentication code 730 to an appropriate developer.

In these steps of distributing the authentication code, a safe distribution should be performed by performing an encryption process. For example, when the authentication code distributed by electronic mail, encryption means such as PGP (Pretty Good Privacy) can be adopted.

FIG. 18 shows an example of the structure of functions of the communication device according to the other embodiment of the present invention. Similarly to the case of FIG. 3, the corresponding portion when two communication devices 301 and 302 are connected to a network 350 is shown. The communication device of FIG. 18 has the same functional configuration as that of the communication device of FIG. 3 except that the network interface 322 has a code memory 3227 and the processing content of the service registration request section 3128, the service registration section 3228, the service finding instruction section 3119, the service finding request section 3219, and the service search section 3229 differs.

The code memory 3227 is a memory for holding the secret code 710. When the secret code 710 is used in the authentication code generation logic 720, the service registration section 3228 reads the secret code 710 from the code memory 3227. Therefore, in the communication device that generates the authentication code without using the secret code 710, this code memory 3227 is not always necessary.

The service registration instruction section 3128 instructs the service registration section 3228 to register the content of the services that can be provided by the communication device 302 in the profile memory 3222. At this time, the permission flag 671 of the security information 617 can be set to "with permission". In that case, a valid authentication code 730 needs to be presented. The service registration instruction section 3128 instructs the registration of the services by, for example, API provided by the network interface 322.

When there is a service registration instruction from the service registration instruction section 3128 of the host system 312, the service registration section 3228 verifies the presented authentication code when the permission flag 671 indicates "with permission". When the code is a valid authentication code as a result of the verification, the service registration section 3228 records the service profile 610 in the profile memory 3222.

However, when the service profile 610 having the same attributes are already registered, the service profile 610 is recorded in the profile memory 3222 only when the permission flag 671 of the existing service profile 610 does not indicate "with permission". At this time, the existing service profile 610 is deleted by an overwrite.

The service finding instruction section 3119 is designed to perform an instruction for finding services. The service finding instruction section 3119 creates a service profile containing services to be found, and instructs the finding of the services by using, for example, API provided by the network interface 321. At this time, when it is desired to find authorized services, the permission flag 671 is set to "with permission" in order to instruct the finding of the services. When it is desired to limit the publisher, furthermore, for example, the company name of the publisher is written in the publisher information 672. On the other hand, when the publisher is not limited, a symbol (for example, all "1s") indicating a wildcard is written in the publisher information 672.

In response to the instruction from the service finding instruction section 3119, the service finding request section 3219 outputs a protocol for finding services via the network 350 by broadcast or multicast.

The service search section 3229 receives the service finding protocol that is broadcast or multicast by the service finding instruction section 3119, and checks if the condition inquired by the service finding protocol matches the service profile held in the profile memory 3222. When it is determined that there is a match, the service search section 3223 outputs, by unicast, a response protocol to the communication device 301 that has made the inquiry via the network 350. On the other hand, when it is determined that there is no match, the service search section 3223 discards the received service finding protocol and responds nothing.

At this time, the service search section 3229 also checks the security information 617 when a determination is made as to the match of the service profiles. That is, when the finding of services in which the permission flag 671 indicates "with permission" is requested, a search for a service profile in which the permission flag 671 indicates "with permission" in the profile memory 3222 is performed. Then, when the publisher information 672 is specified, the match of the publisher information 672 is also made the matching condition. On the other hand, when the permission flag 671 in the service finding request does not indicate "with permission", the security information 617 is not made to be the search condition, and only the function items other than those are made to be the search conditions.

Next, the operation of the communication device according to the other embodiment of the present invention is described with reference to the drawings.

Figure 19:
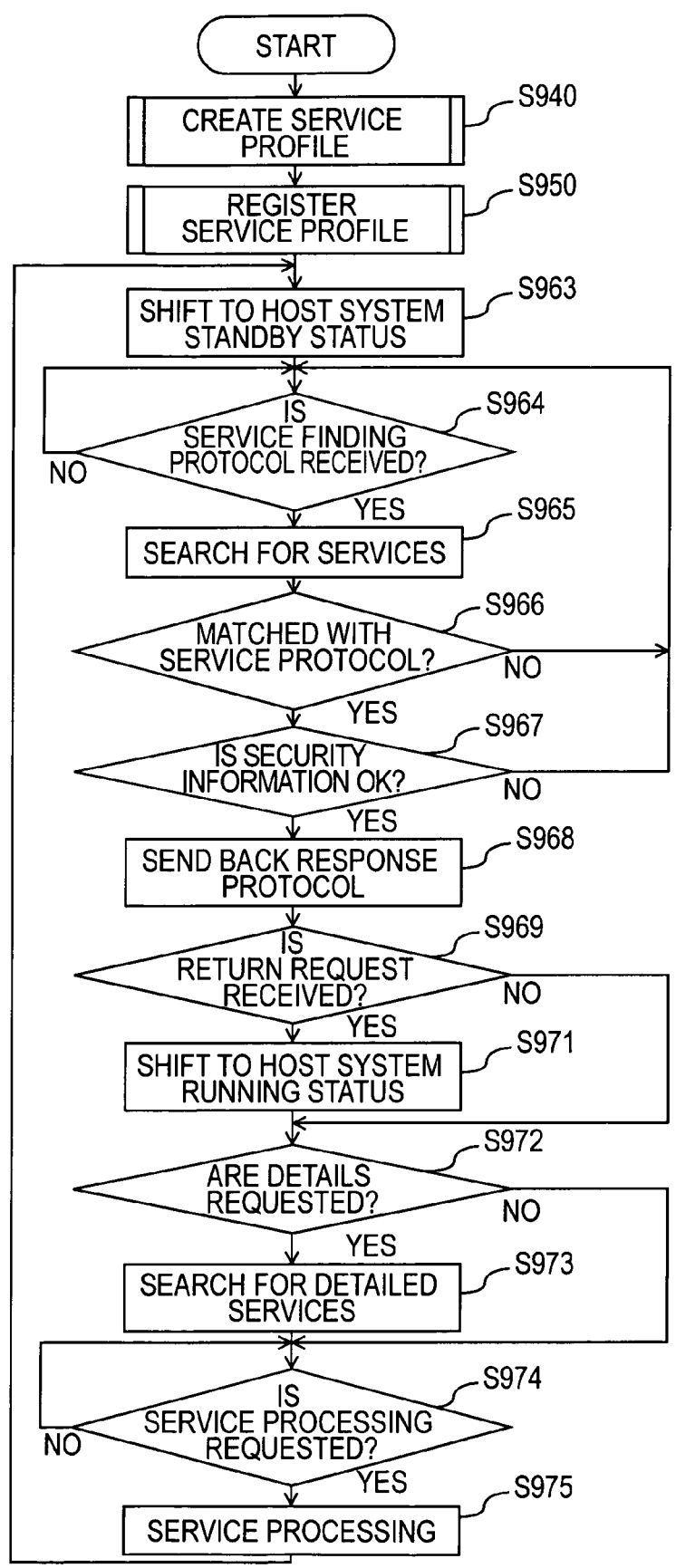
FIG. 19 shows the processing procedure of a communication device 302 on the service providing side according to the other embodiment of the present invention.

FIG. 19 shows the processing procedure of the communication device 302 (FIG. 18) on the service providing side according to the other embodiment of the present invention. Initially, when the service profile of the device is created (step S940), in accordance with the instruction from the service registration instruction section 3128, the service registration section 3228 registers the service profile in the profile memory 3222 (step S950). Regarding the creation and the registration of the service profile, differences from the case of FIG. 3 will be described later with reference to FIGS. 20 and 21. It is the same as in the case of FIG. 11 that, thereafter, the host system 312 of the communication device 302 is able to shift to the standby status (step S963).

Thereafter, when the service search section 3229 receives a service finding protocol from another communication device (step S964), the service search section 3229 searches for the service profile held in the profile memory 3222 (step S965). Then, when the condition contained in the service finding protocol matches the service profile held in the profile memory 3222 (step S966) and if the security information 617 is checked and the condition is satisfied (step S967), the service search section 3229 sends back a response protocol to the other communication device (step S968). The subsequent processing is the same as in the case of FIG. 11.

On the other hand, when the matching service profile is not found or the condition of the security information 617 is not satisfied in step S916, the service finding protocol is ignored and the process waits for the next service finding protocol to be received (step S964).

Figure 20:
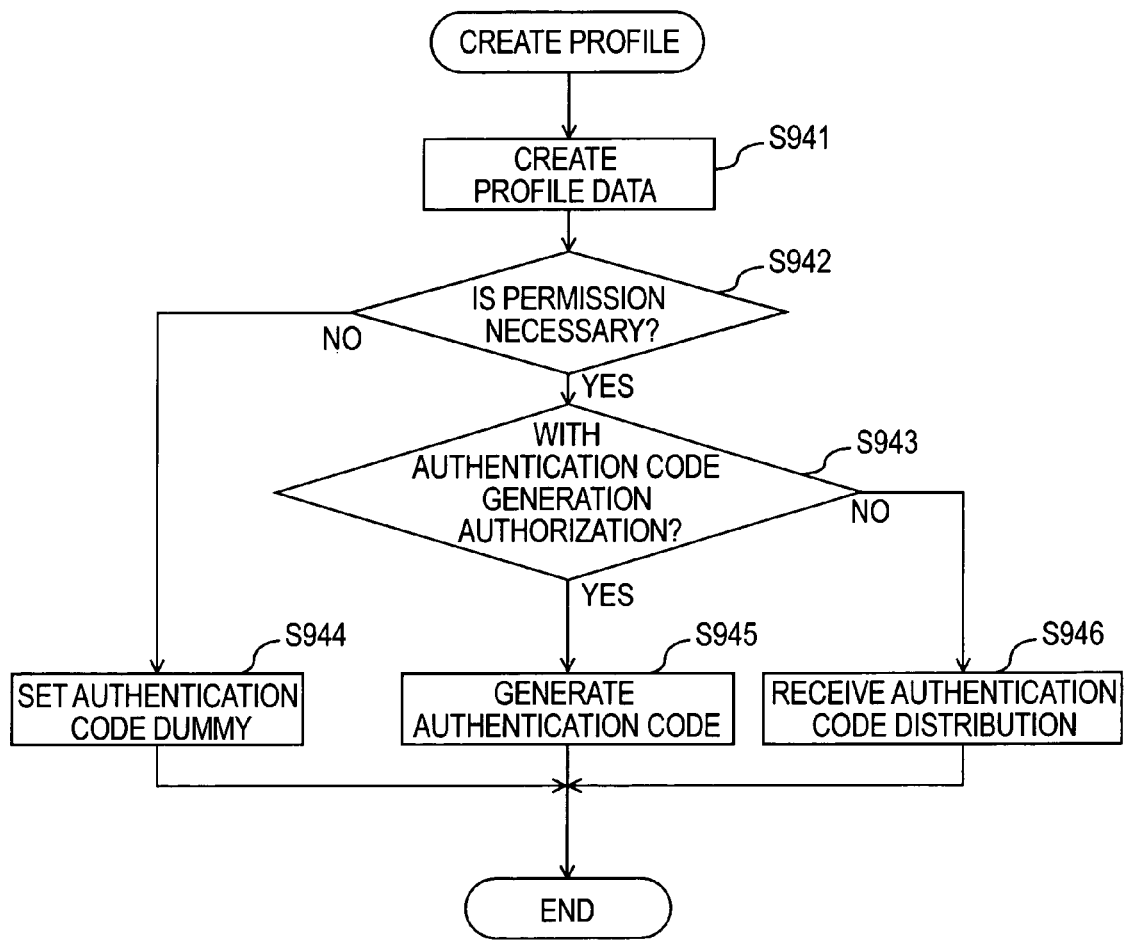
FIG. 20 shows the processing procedure for creating a profile according to the other embodiment of the present invention.

FIG. 20 shows the processing procedure for creating a profile according to the other embodiment of the present invention. After data necessary for creating the service profile 610 is created (step S941), if the permission flag 671 does not indicate "with permission" (step S942), the authentication code is not necessary. Therefore, when the authentication code needs to be presented as a fixed format, a dummy is set in the authentication code (step S944).

When the permission flag 671 indicates "with permission" (step S942), if it has an authorization for generating an authentication code (step S943), the authentication code is generated (step S945). On the other hand, if it does not have an authorization for generating a authentication code (step S943), as described with reference to FIG. 17, it requests the supplier or the developer to generate the authentication code (step S946).

Figure 21:
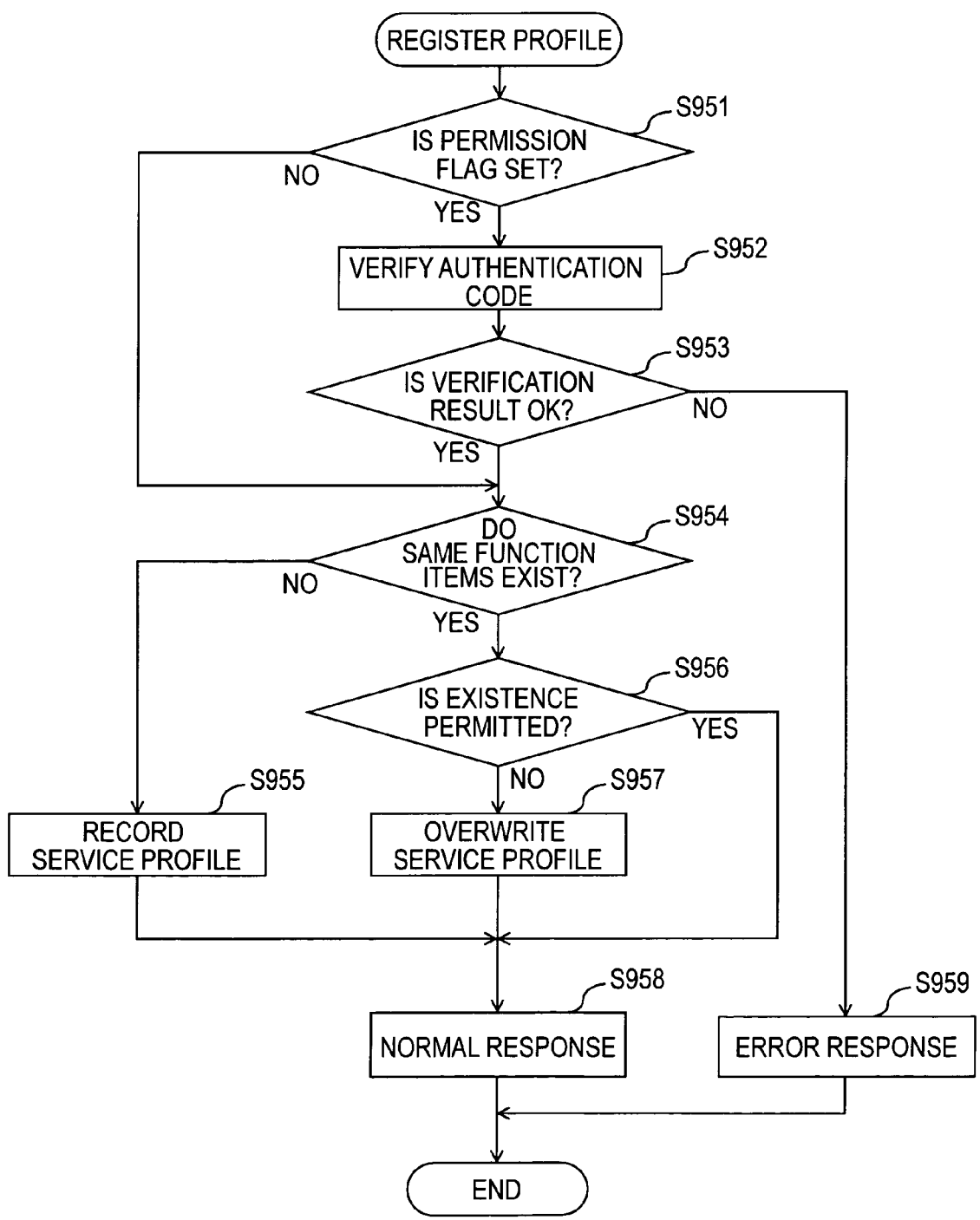
FIG. 21 shows the processing procedure for registering a profile.

FIG. 21 shows the processing procedure for registering a profile according to the other embodiment of the present invention. When the permission flag 671 indicates "with permission" (step S951), the service registration section 3228 verifies the presented authentication code (step S952). At this time, when the authentication code is not valid (step S953), the service profile is discarded, and an error response is made to the host system 312 (step S959).

When the permission flag 671 does not indicate "with permission" (step S951) or when the authentication code is valid (step S953), a determination is made as to whether or not duplicating service profile having the same function items is already registered in the profile memory 3222 (step S954). If it is not registered, the service profile is recorded in the profile memory 3222 (step S955).

When the duplicating service profile having the same function items is already registered in the profile memory 3222 (step S954), a new service profile is overwritten in the profile memory 3222 (step S957) only when the permission flag 671 of the already transmitted service profile does not indicate "with permission" (step S956).

When the permission flag 671 does not indicate "with permission" (step S951) or when the authentication code is valid (step S953), thereafter, a normal response is made to the host system 312 (step S958).

As described above, in the other embodiment of the present invention, as a result of providing the security information 611 in the service profile 610, the services can be registered by making a distinction as to whether or not the services are authorized, and the reliability for the services that are provided can be further improved.

The processing procedure of the communication device 301 (FIG. 18) on the service request side in the other embodiment of the present invention is the same as that of the embodiment of the present invention described with reference to FIG. 12. However, the processing procedure differs from that in the case of FIG. 12 in that the security information 611 can be included in creating a service profile when a service finding function is called.

According to the embodiments of the present invention, the first communication device corresponds to, for example, the communication device 301, and the inquiry means corresponds to, for example, the service finding request section 3213 or 3219. The second communication device corresponds to, for example, the communication device 302. The attribute holding means corresponds to, for example, the profile memory 3222. The search means corresponds to, for example, the service search section 3223 or 3229.

According to the embodiments of the present invention, the attributes holding means corresponds to, for example, the profile memory 3222. The search means corresponds to, for example, the service search section 3223 or 3229.

According to the embodiments of the present invention, the attribute registration means corresponds to, for example, the service registration section 3221 or 3228.

According to the embodiments of the present invention, the information related to services corresponds to, for example, the service profile 610.

According to the embodiments of the present invention, the type of the protocol corresponds to, for example, the protocol information 613.

According to the embodiments of the present invention, the content and the type of the services correspond to, for example, the service characteristic information 615 and the service type information 614, respectively.

According to the embodiments of the present invention, the higher-order layer processing means corresponds to, for example, the host system 312.

According to the embodiments of the present invention, the status control means corresponds to, for example, the status control section 3224.

According to the embodiments of the present invention, the attribute holding means corresponds to, for example, the profile memory 3222. The procedure for receiving an inquiry from another communication device via the network corresponds to, for example, step S914 or S964. The procedure for searching for attributes held in the attribute holding means in response to an inquiry corresponds to, for example, step S915 or S965. The procedure for responding back the search result to the other communication device corresponds to, for example, step S918 or S968.

According to the embodiments of the present invention, the attribute holding means corresponds to, for example, the profile memory 3222. The procedure for receiving an inquiry targeting permitted services from another communication device via the network corresponds to, for example, step S964. The procedure for searching for attributes held in the attribute holding means by targeting the permitted services in response to an inquiry corresponds to, for example, steps S965 to S967. The procedure for sending back the search result to the other communication device via the network corresponds to, for example, step S968.

According to the embodiments of the present invention, the attribute holding means corresponds to, for example, the profile memory 3222. The high-order layer processing means corresponds to, for example, the host system 312. The procedure for receiving an inquiry from another communication device via the network corresponds to, for example, step S914 or S964. The procedure for searching for attributes held in the attribute holding means in response to an inquiry corresponds to, for example, step S915 or S965. The procedure for sending back the search result to the other communication device via the network corresponds to, for example, step S918 or S968. The procedure for receiving a return request from another communication device via the network corresponds to, for example, step S919 or S969. The procedure for returning the higher-order layer processing means from a standby status in response to a request corresponds to, for example, step S921 or S971.

The processing procedures described in the embodiments of the present invention may be considered as a method having the series of procedures or may be considered as a program for enabling a computer to execute the series of procedures or as a recording medium for storing the program.

As utilization examples of the present invention, the present invention can be applied, for example, when communication devices are connected in a network to construct the network, and predetermined services are realized while performing communication between apparatuses incorporating such a communication device or apparatuses connected to a communication device.

It should be understood by those skilled in the art that various modifications, combinations, sub-combinations and alterations may occur depending on design requirements and other factors insofar as they are within the scope of the appended claims or the equivalents thereof.

What is claimed is:

1. A network system comprising:
   at least first and second communication devices connected in a network,
   wherein the first communication device includes:
      inquiry means for inquiring the attributes of the second communication device to the second communication device via the network,
   the second communication device includes:
      attribute holding means for holding the attributes; and
      search means for searching for the attributes held in the attribute holding means in response to the inquiry and responds back with the search result to the inquiry means, and
      the attribute holding means and the search means operate in a data link layer, the data link layer being one of a plurality of layers of an Open System Interconnection reference model for layered network communications.

2. The network system according to claim 1, wherein the attributes of the communication device contain information indicating whether or not services provided by the target communication device are permitted,
   the inquiry means makes an inquiry by targeting the permitted services, and
   the search means performs the search by targeting the permitted services in response to the inquiry.

3. A communication device, which is one of a plurality of communication devices connected in a network, the communication device comprising:
   attribute holding means for holding the attributes of the target communication device; and
   search means for searching for the attributes held in the attribute holding means in response to an inquiry from another communication device via the network and responding back the search result to the other communication device via the network,
   wherein the attribute holding means and the search means operate in a data link layer, the data link layer being one of a plurality of layers of an Open System Interconnection reference model for layered network communications.

4. The communication device according to claim 3, wherein the attributes of the communication device contain information indicating whether or not services provided by the target communication device are permitted, and
   when the inquiry is an inquiry targeting the permitted services, the search means performs the search by targeting the permitted services in response to the inquiry.

5. The communication device according to claim 4, wherein the attributes of the communication device further contain publisher information indicating the publisher who has permitted the services provided by the target communication device, and when the inquiry is an inquiry in which the publisher information is specified, the search means performs the search by targeting the services in which publisher information matches in response to the inquiry.

6. The communication device according to claim 3, further comprising attribute registration means for registering the attributes of the communication device in the attribute holding means.

7. The communication device according to claim 6, wherein the attributes of the communication device contain information indicating whether or not services provided by the target communication device are permitted, and the attribute registration means verifies the presented authentication code when the services are permitted in the attributes to be registered of the communication device and performs the registration only when the authentication code is valid.

8. The communication device according to claim 7, wherein, when the attributes that duplicate to the attributes to be registered of the communication device are already registered, the attribute registration means newly registers the attributes of the communication device only when the services in the already registered attributes are not permitted.

9. The communication device according to claim 3, wherein the attributes of the communication device contain information about services provided by the target communication device.

10. The communication device according to claim 9, wherein the information about the services provided by the communication device contains the type of a protocol that governs the target services.

11. The communication device according to claim 9, wherein the information about the services provided by the communication device contains the content and the type of the target services.

12. The communication device according to claim 9, wherein the attribute holding means holds the attributes using a plurality of bits and allows information about the services to correspond to each of the plurality of the bits.

13. The communication device according to claim 3, further comprising higher-order layer processing means for processing layers at an order higher than the data link layer in the communication device, and the attributes of the communication device contain the operation state of the higher-order layer processing means.

14. The communication device according to claim 13, wherein the operation state indicates whether or not the higher-order layer processing means is in a standby state.

15. The communication device according to claim 13, further comprising status control means for controlling the running state in response to a request from another communication device via the network.

16. The communication device according to claim 3, wherein the network is a wireless ad hoc network, and the communication device is a wireless terminal that constitutes the wireless ad hoc network.

17. A processing method through a data link layer for use with a communication device, which is one of a plurality of communication devices connected in a network, the communication device comprising attribute holding means for holding the attributes of the target communication device, the processing method comprising the steps of:

receiving an inquiry from another communication device via the network;

searching for the attributes held in the attribute holding means in response to the inquiry, the attribute holding means operating in the data link layer being one of a plurality of layers of an Open System Interconnection reference model for layered network communications; and responding back the search result to the other communication device via the network.

18. A processing method through a data link layer for use with a communication device, which is one of a plurality of communication devices connected in a network, the communication device comprising attribute holding means for holding the attributes of the target communication device, and the attributes of the communication device containing information indicating whether or not the services provided by the target communication device are permitted, the processing method comprising the steps of:

receiving an inquiry that targets the permitted services from another communication device via the network;

searching for the attributes held in the attribute holding means by targeting the permitted services in response to the inquiry, the attribute holding means operating in the data link layer being one of a plurality of layers of an Open System Interconnection reference model for layered network communications; and responding back the search result to the other communication device via the network.

19. A processing method through a data link layer for use with a communication device, which is one of a plurality of communication devices connected in a network, the communication device comprising attribute holding means for holding the attributes of the target communication device and higher-order layer processing means for processing layers at an order higher than a data link layer in the target communication device, the processing method comprising the steps of:

allowing the higher-order layer processing means to be placed in a standby status;

receiving an inquiry from another communication device via the network;

searching for the attributes held in the attribute holding means in response to the inquiry;

responding back the search result to the other communication device via the network;

receiving a return request from the other communication device via the network; and returning the higher-order layer processing means from the standby status in response to the inquiry.

20. A non-transitory computer readable storage medium having stored thereon a program that when executed by a computer based communication device, which is one of a plurality of communication devices connected in a network, the communication device comprising attribute holding means for holding the attributes of the target communication device, causes the communication device to perform processing for a data link layer comprising the steps of:

receiving an inquiry from another communication device via the network;

searching for the attributes held in the attribute holding means in response to the inquiry, the attribute holding means operating in the data link layer being one of a plurality of layers of an Open System Interconnection reference model for layered network communications; and responding back the search result to the other communication device via the network.

21. A non-transitory computer readable storage medium having stored thereon a program that when executed by a computer based communication device, which is one of a plurality of communication devices connected in a network, the communication device comprising attribute holding means for holding the attributes of the target communication device, the attributes of the communication device containing information indicating whether or not the services provided by the target communication device are permitted, causes the communication device to perform processing for a data link layer comprising the steps of:

receiving an inquiry that targets the permitted services from another communication device via the network;

searching for the attributes held in the attribute holding means by targeting the permitted services in response to the inquiry, the attribute holding means operating in the data link layer being one of a plurality of layers of an Open System Interconnection reference model for layered network communications; and responding back the search result to the other communication device via the network.

22. A non-transitory computer readable storage medium having stored thereon a program that when executed by a computer based communication device, which is one of a plurality of communication devices connected in a network, the communication device comprising attribute holding means for holding the attributes of the target communication device and higher-order layer processing means for processing layers at an order higher than a data link layer in the target communication device, causes the communication device to perform processing for a data link layer comprising the steps of:

allowing the higher-order layer processing means to be placed in a standby status;

receiving an inquiry from another communication device via the network;

searching for the attributes held in the attribute holding means in response to the inquiry;

responding back the search result to the other communication device via the network;

receiving a return request from the other communication device via the network; and returning the higher-order layer processing means from the standby status in response to the request.

23. A communication device, which is one of a plurality of communication devices connected in a network, the communication device comprising:

an attribute holding section holding the attributes of the target communication device; and a search section searching for the attributes held in the attribute holding section in response to an inquiry from another communication device via the network and responding back the search result to the other communication device via the network, wherein the attribute holding section and the search section operate in a data link layer, the data link layer being one of a plurality of layers of an Open System Interconnection reference model for layered network communications.

* * * * *